US008695041B2

(12) United States Patent
Wasilewski et al.

(10) Patent No.: US 8,695,041 B2
(45) Date of Patent: Apr. 8, 2014

(54) PORTABILITY OF PERSONALIZED TELEVISION SETTINGS AND PREFERENCES

(76) Inventors: Anthony J. Wasilewski, Alpharetta, GA (US); Arturo A. Rodriguez, Norcross, GA (US)

( * ) Notice: Subject to any disclaimer, the term of this patent is extended or adjusted under 35 U.S.C. 154(b) by 2326 days.

(21) Appl. No.: 11/385,184

(22) Filed: Mar. 20, 2006

(65) Prior Publication Data

US 2006/0161956 A1    Jul. 20, 2006

Related U.S. Application Data

(63) Continuation of application No. 10/372,182, filed on Feb. 21, 2003, now abandoned.

(51) Int. Cl.
*H04H 60/33* (2008.01)
*G06F 3/00* (2006.01)
*G06F 13/00* (2006.01)
*H04N 5/445* (2011.01)
*H04N 7/20* (2006.01)
*H04N 7/18* (2006.01)

(52) U.S. Cl.
USPC ...... 725/58; 725/9; 725/68; 725/85; 725/100; 725/110; 725/131; 725/139

(58) Field of Classification Search
USPC .............. 725/58, 59, 74, 78, 82, 85, 86, 110, 725/131–134, 139–142, 151–153, 80, 68, 725/100
See application file for complete search history.

(56) References Cited

U.S. PATENT DOCUMENTS

| | | | |
|---|---|---|---|
| 5,699,107 A * | 12/1997 | Lawler et al. | 725/58 |
| 6,081,830 A | 6/2000 | Schindler | 709/204 |
| 6,637,029 B1 * | 10/2003 | Maissel et al. | 725/46 |
| 6,754,904 B1 | 6/2004 | Cooper et al. | 725/32 |
| 6,813,775 B1 * | 11/2004 | Finseth et al. | 725/46 |
| 2002/0120932 A1 | 8/2002 | Schwalb | 725/37 |
| 2002/0152472 A1 | 10/2002 | Istvan et al. | 725/117 |
| 2003/0084455 A1 | 5/2003 | Gudorf et al. | 725/109 |
| 2003/0110499 A1 * | 6/2003 | Knudson et al. | 725/42 |
| 2003/0182663 A1 | 9/2003 | Gudorf et al. | 725/110 |
| 2003/0229892 A1 | 12/2003 | Sardera | 725/9 |
| 2005/0028208 A1* | 2/2005 | Ellis et al. | 725/58 |
| 2005/0076367 A1 | 4/2005 | Johnson et al. | 725/58 |

FOREIGN PATENT DOCUMENTS

WO    WO 00/04707 A1 *  1/2000    ............. H04H 1/00
WO    WO 0004707 A1 *  1/2000    ............. H04H 1/00

* cited by examiner

*Primary Examiner* — James R Sheleheda
*Assistant Examiner* — Alazar Tilahun
(74) *Attorney, Agent, or Firm* — Merchant & Gould P.C.

(57) ABSTRACT

A method for transferring DHCT settings includes receiving by a first digital home communication terminal (DHCT) a request for transmitting a DHCT setting from the first DHCT to a second DHCT, and transmitting the DHCT setting from the first DHCT to the second DHCT. Systems and other methods for transferring DHCT settings are also provided.

6 Claims, 17 Drawing Sheets

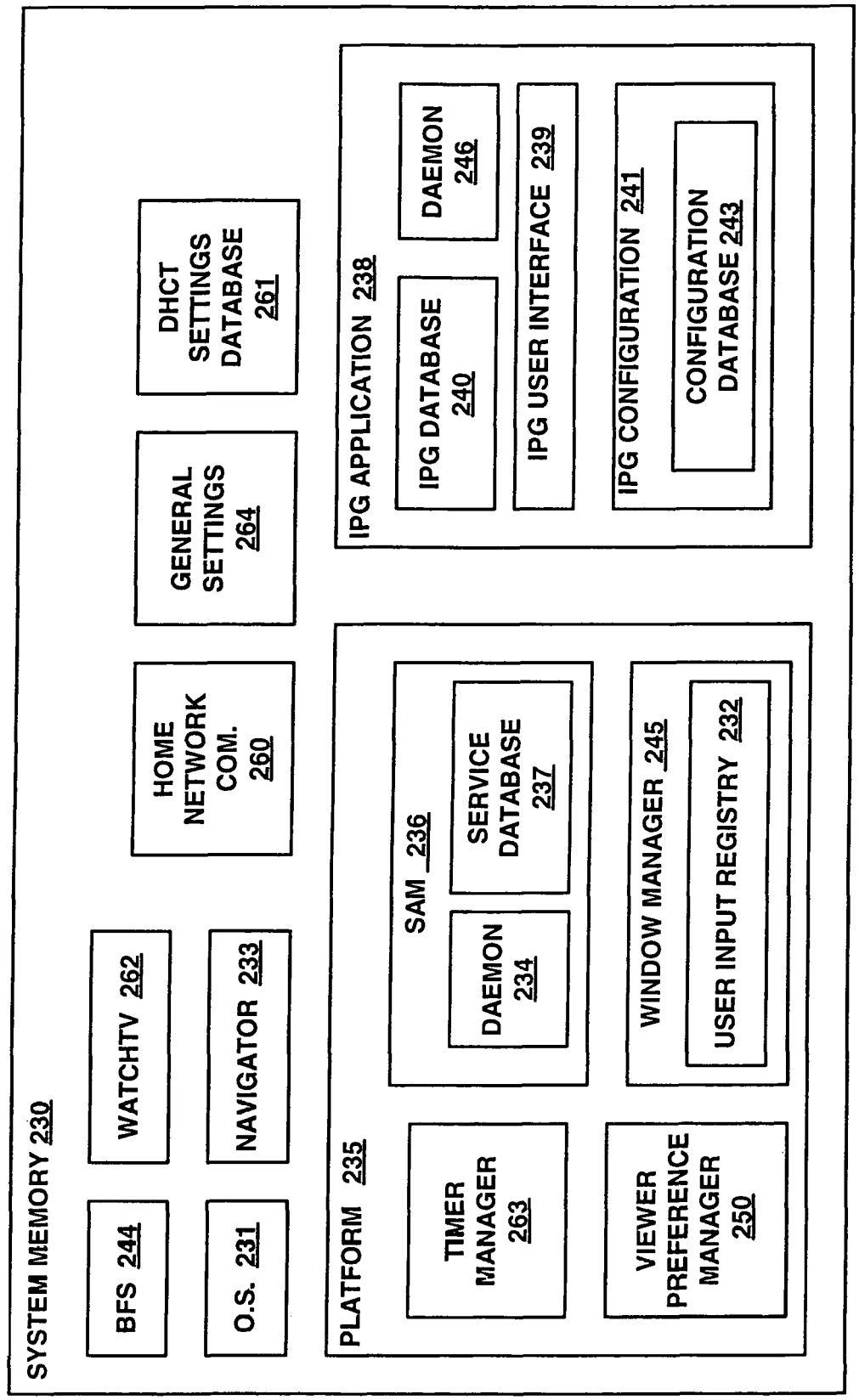

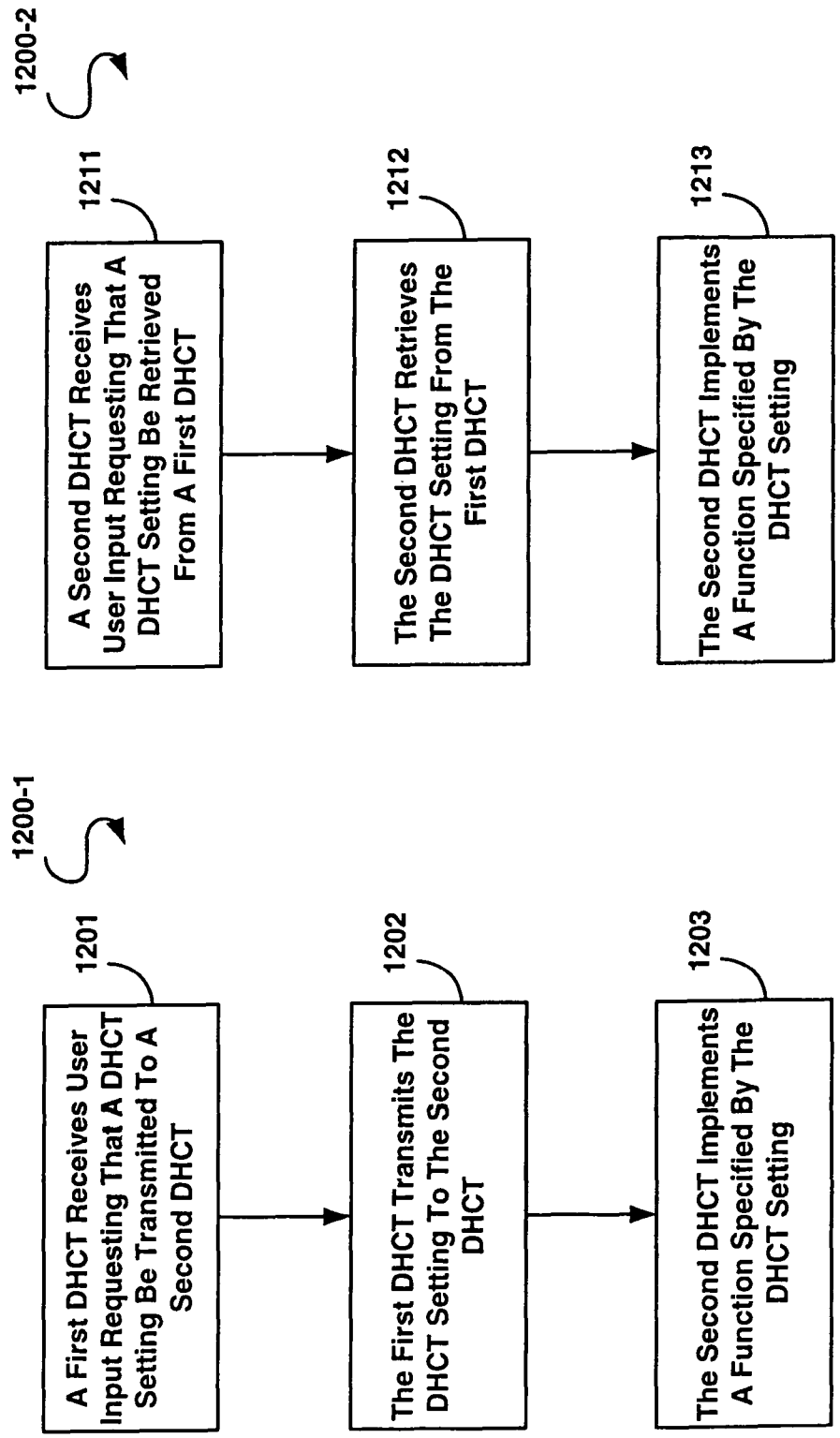

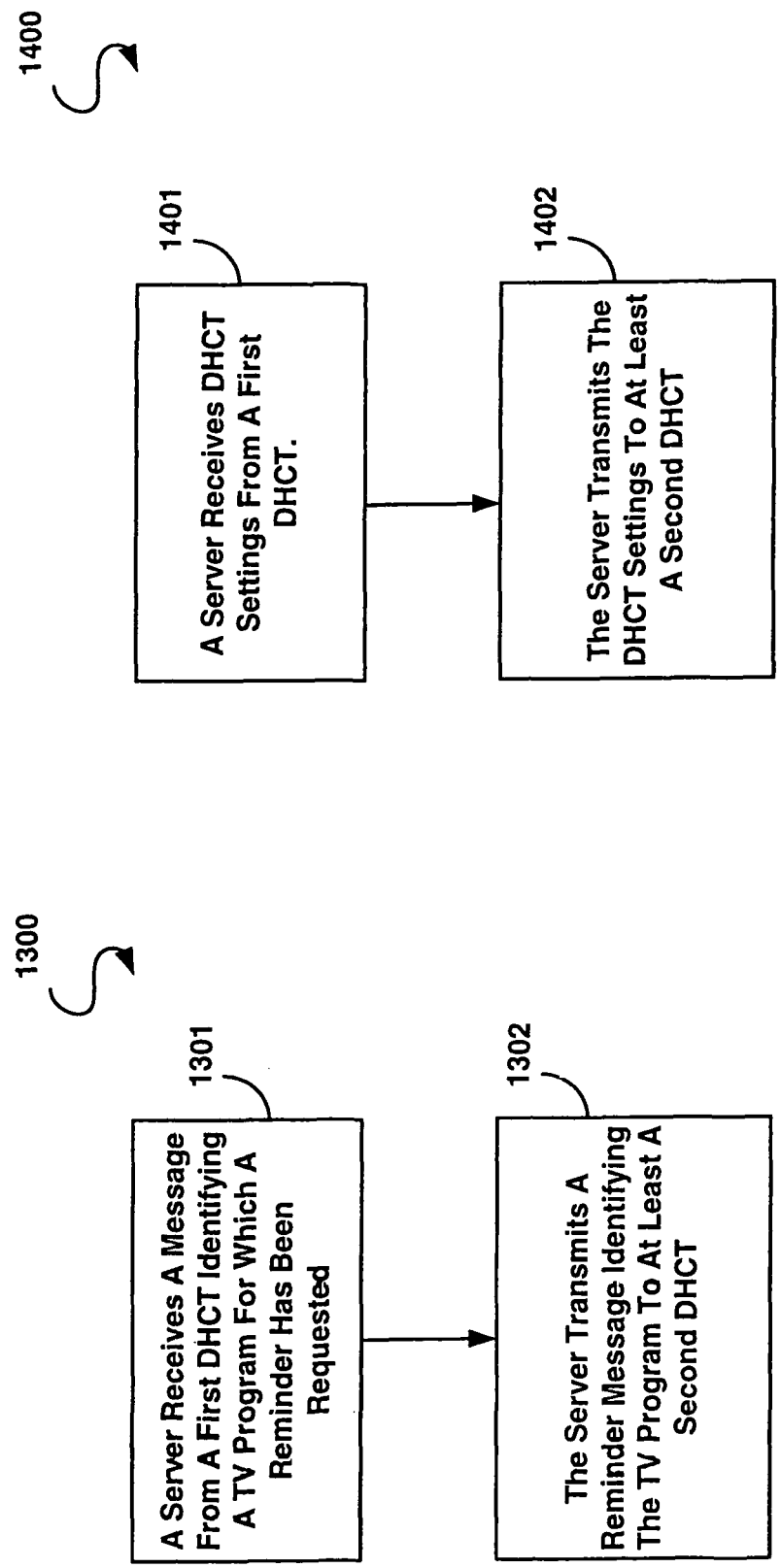

PORTABILITY OF PERSONALIZED TELEVISION SETTINGS AND PREFERENCES

CROSS-REFERENCE TO RELATED APPLICATION

This application is a continuation of U.S. patent application Ser. No. 10/372,182, filed Feb. 21, 2003 now abandoned, which is entirely incorporated herein by reference.

FIELD OF THE INVENTION

This invention relates in general to television systems, and more particularly, to the field of television set-top terminals.

DESCRIPTION OF THE RELATED ART

Subscriber television systems are now capable of providing many services in addition to analog broadcast video. In implementing enhanced programming, the home communication terminal ("HCT"), otherwise known as a set-top box, has become an important computing device for accessing various video services. In addition to supporting traditional analog broadcast video functionality, digital HCTs (or "DHCTs") now also support an increasing number of two-way digital services such as video-on-demand.

A DHCT is typically connected to a cable or satellite television network and includes hardware and software for providing various services and functionality. In some systems, software executed by a DHCT can be downloaded and/or updated via the subscriber television network. The ability to download software provides flexibility in adding or updating applications executed by the DHCT. Each DHCT also typically includes a processor, communication components, and memory, and is connected to a television. While many conventional DHCTs are stand-alone devices that are externally connected to a television, a DHCT and/or its functionality may be integrated into a television or other display device, as will be appreciated by those of ordinary skill in the art.

Many DHCTs are capable of providing a viewer with hundreds of channels. As a result, viewers may have so many viewing options that they often miss television programs that they had intended to watch. Some viewers may plan on recording future programs but forget to set their video cassette recorder timers. Others do not record their favorite programs because video cassette recorder timers often appear too tedious or difficult to set, especially when operating in conjunction with a cable television box. Some viewers who plan on watching a program may invoke an electronic reminder feature provided by a DHCT. However, this reminder feature may be ineffective if the viewer is outside the room in which the DHCT is located at the time that a reminder is provided by the DHCT. As a result, there is a need for systems and methods that address these and/or other problems associated with DHCTs.

BRIEF DESCRIPTION OF THE DRAWINGS

The invention can be better understood with reference to the following drawings. The components in the drawings are not necessarily drawn to scale, emphasis instead being placed upon clearly illustrating the principles of the present invention. In the drawings, like reference numerals designate corresponding parts throughout the several views.

FIG. 2B is a block diagram illustrating a non-limiting example of selected components of memory contained in the DHCT shown in FIG. 2A.

FIG. 12A is a flow chart depicting a method for transferring user-preference settings in accordance with one embodiment of the invention.

FIG. 12B is a flow chart depicting a method for transferring user-preference settings in accordance with another embodiment of the invention.

FIG. 13 is a flow chart depicting a method for providing a reminder in accordance with another embodiment of the invention.

FIG. 14 is a flow chart depicting a method for transferring user-preference settings in accordance with another embodiment of the invention.

DETAILED DESCRIPTION OF THE PREFERRED EMBODIMENTS

The preferred embodiments of the invention now will be described more fully hereinafter with reference to the accompanying drawings. In particular, preferred embodiments of managing user-defined settings in a subscriber television system will be described. Examples of user-defined settings include, among others, reminder messages (set with a user's input) that are scheduled by the user in order to remind the user of upcoming television programs. In one embodiment of the invention, a first digital home communication terminal (DHCT) receives user input requesting that a reminder be set for a desired television program and then transmits a reminder request to a second DHCT. The second DHCT may or may not be identified at the time that the reminder is set. The reminder request identifies the desired television program for which the reminder was requested. The second DHCT then provides the user at a future time with a reminder notice for the desired television program. Other embodiments of the invention are also described below.

In the description that follows, FIGS. 1-5 will provide examples of system components that may be used to help implement and/or manage user-defined settings. Furthermore, user interface (UI) screens that may be provided in connection with requesting a reminder notice for a television program are illustrated in FIGS. 6-10. Finally, examples of methods for managing user defined settings are illustrated in the flow charts of FIGS. 11-14. Note, however, that the invention may be embodied in many different forms and should not be construed as limited to the embodiments set forth herein. Furthermore, all examples given herein are intended to be non-limiting, and are provided in order to help convey the scope of the invention.

Figure 1A:
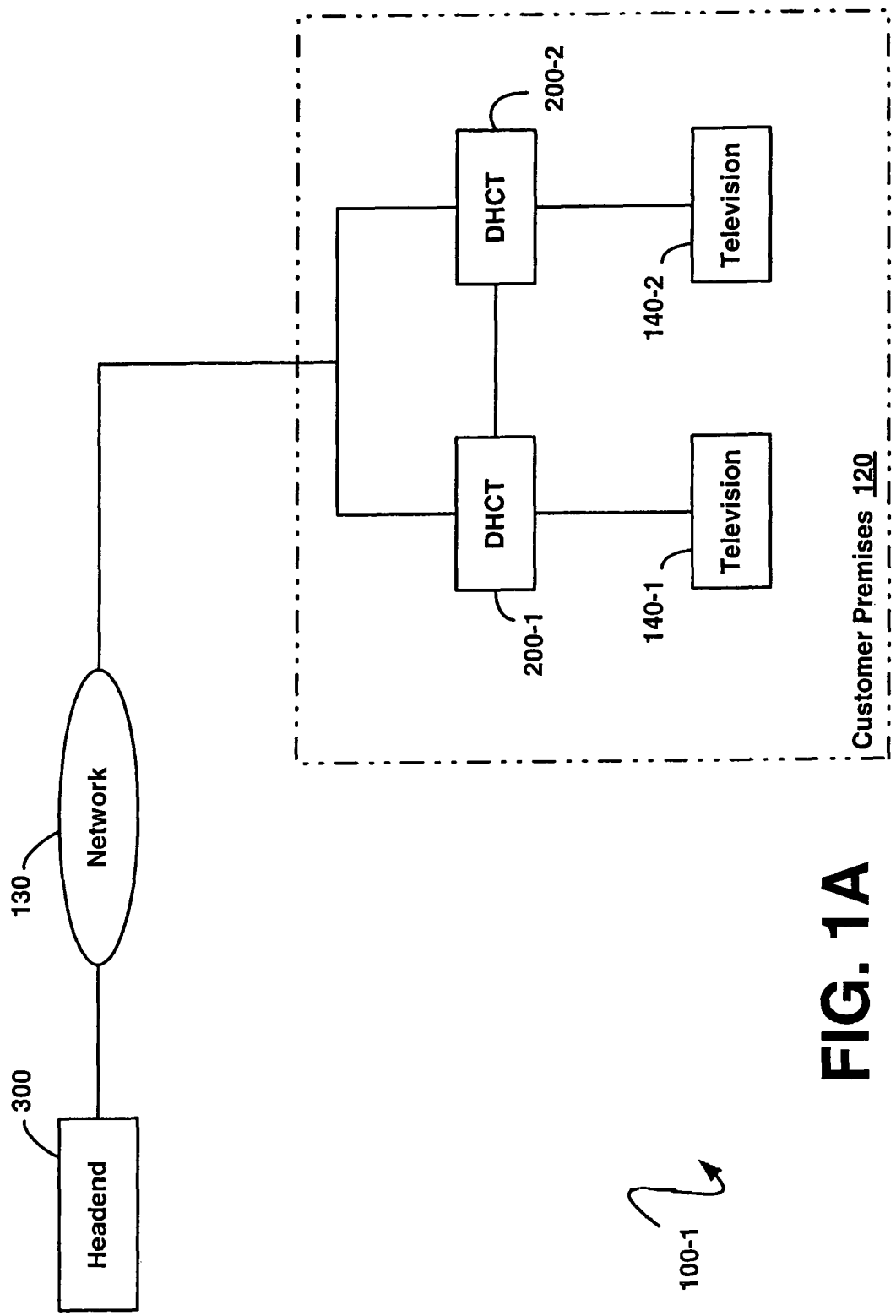
FIGS. 1A-1C are block diagrams depicting non-limiting examples of DHCT settings transfer systems.

FIG. 1A is a block diagram depicting a non-limiting example of a DHCT settings transfer system 100-1. In this example, the DHCT settings transfer system 100-1 includes a headend 300 that is coupled to a DHCT 200-1 and to a DHCT 200-2 via a communications network 130. In another embodiment (not shown), the DHCT 200-2 may be connected to the network 130 only via the DHCT 200-1. The DHCTs 200-1 and 200-2 are typically situated at a customer premises 120 and are connected to respective television sets 140-1 and 140-2. The customer premises 120 may be a residence or place of business for one or more DHCT users. Each DHCT 200 (i.e., DHCT 200-1 or 200-2) may be a stand-alone unit or may be integrated into another device such as, for example, a television set 140. The DHCT 200-1 is configured to provide the DHCT 200-2 with user defined settings, such as, for example, a reminder setting.

A DHCT 200 receives signals (video, audio and/or other data) from the headend 300 through the network 130 and provides any reverse information to the headend 300 through the network 130. The network 130 may be any suitable means for communicating television services data and may be, for example, a cable television network or a satellite communication network. Upstream information may be carried through an auxiliary network such as, for example, a telephone network.

The headend 300 may include one or more server devices (not shown) for providing video, audio, and textual data to DHCTs 200. The headend 300 and each DHCT 200 cooperate to provide a user with television services via a television 140. The television services may include, for example, broadcast television services, cable television services, premium television services, video-on-demand (VOD) services, and/or pay-per-view (PPV) services.

Figure 1B:
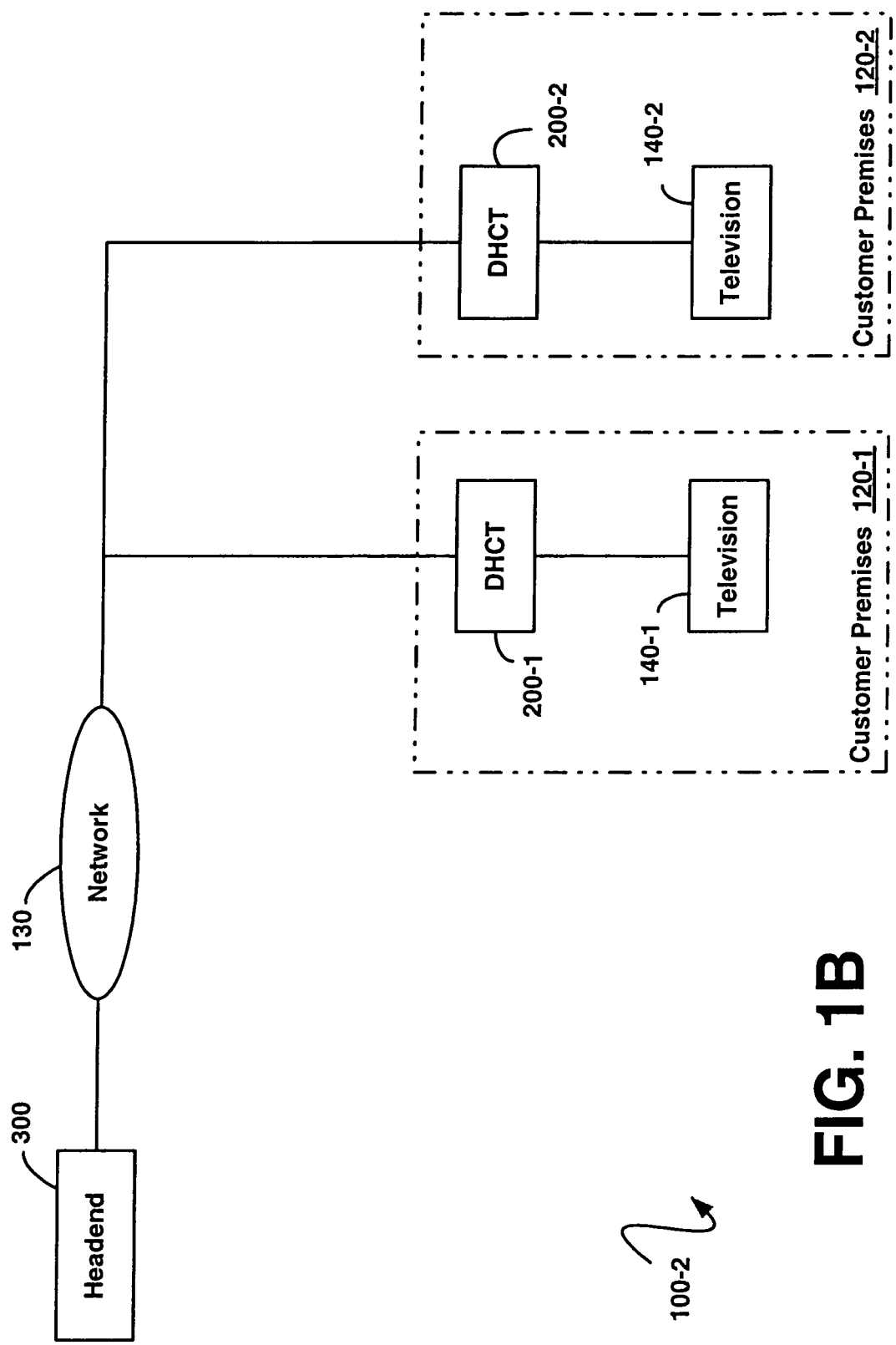
Figure 1C:
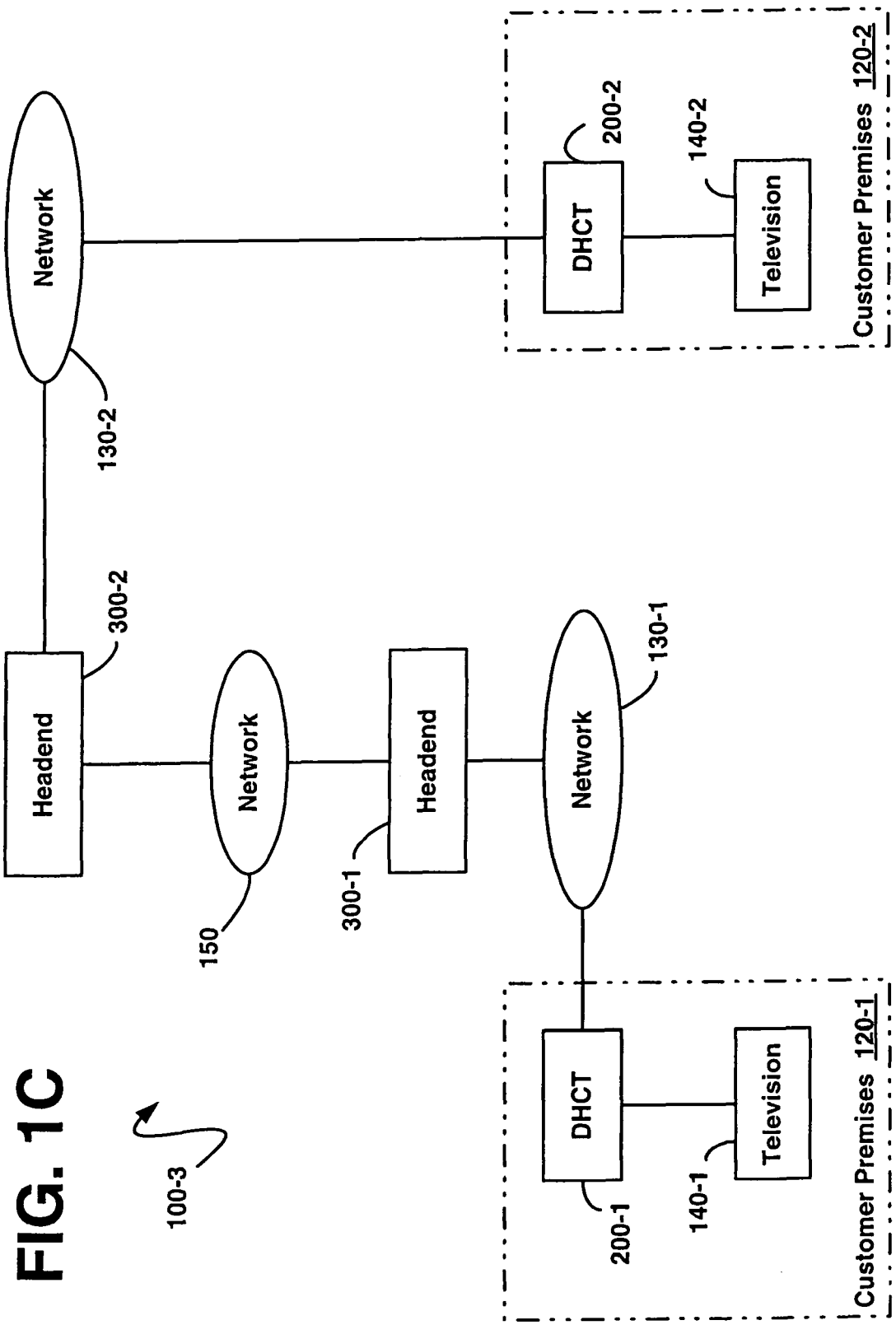

Alternative implementations of the DHCT settings transfer system 100-1 are shown in FIGS. 1B and 1C. In the example of FIG. 1B, a DHCT settings transfer system 100-2 includes a first DHCT 200-1 that is located at a first customer premises 120-1, and a second DHCT 200-2 that is located at a second customer premises 120-2. The DHCT 200-1 may be configured to provide the DHCT 200-2 with user defined settings, such as, for example, a reminder setting. The user defined settings may be first transmitted by the DHCT 200-1 to the headend 300 where they are stored and subsequently downloaded to the DHCT 200-2.

In the example of FIG. 1C, a DHCT settings transfer system 100-3 includes a first DHCT 200-1 that is served by a first headend 300-1, and a second DHCT 200-2 that is served by a second headend 300-2. User defined settings may be transmitted by the DHCT 200-1 to the DHCT 200-2 via the headend 300-1 and the headend 300-2. The headends 300-1 and 300-2 may be coupled via a network 150, which may be, for example, the Internet. In another embodiment, a user may be able to receive DHCT settings (e.g., program reminders) via a device that is not a DHCT (e.g., via a personal computer).

Figure 2A:
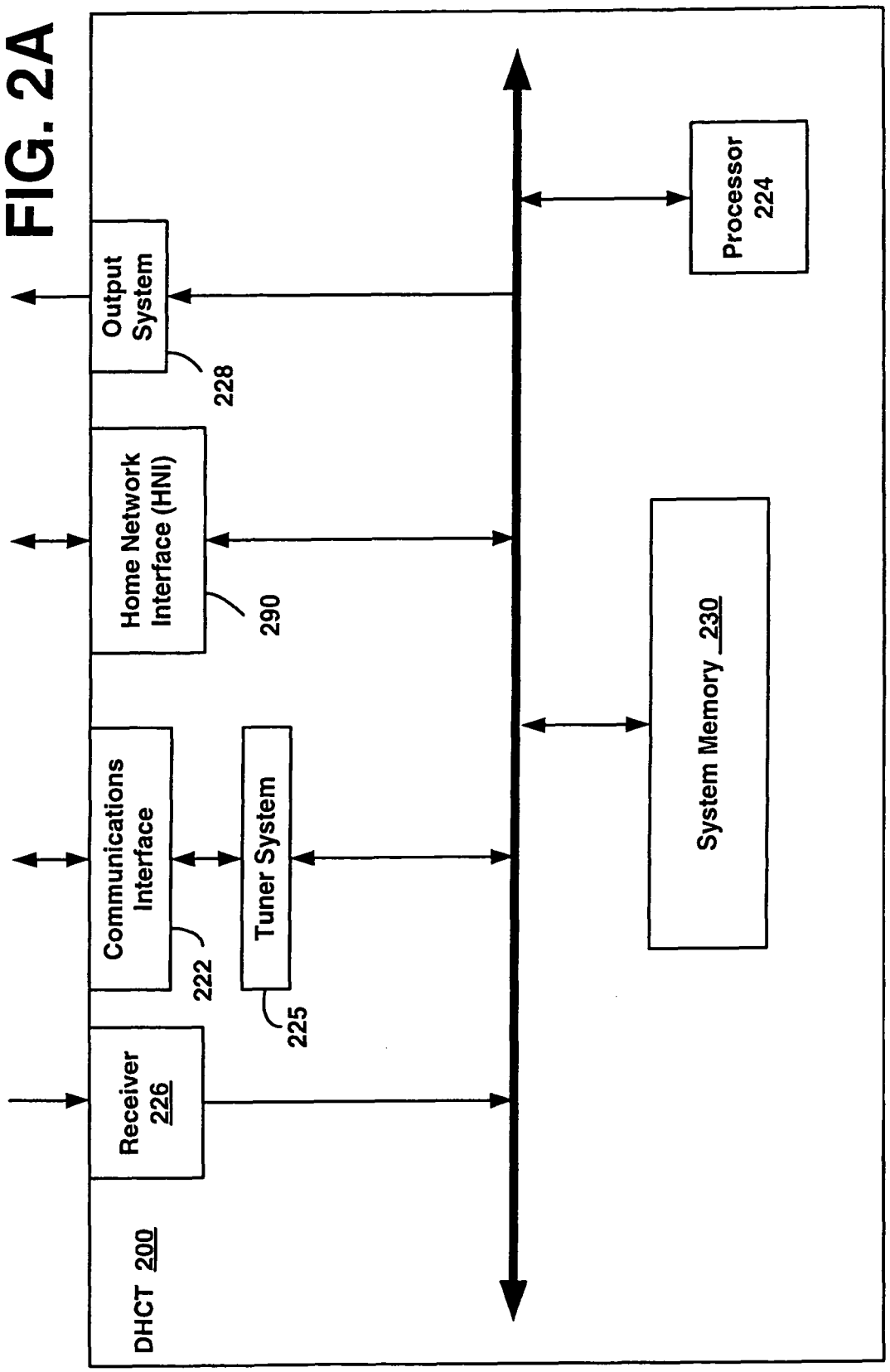
FIG. 2A is a block diagram illustrating a non-limiting example of selected components of a DHCT.

FIG. 2A is a block diagram illustrating a non-limiting example of selected components of a DHCT 200 (i.e., DHCT 200-1 or 200-2). The DHCT 200 comprises a communications interface 222 for receiving video, audio and other data from the headend 300 (FIG. 1), and for providing any reverse information to the headend 300. The DHCT 200 further includes at least one processor 224 for controlling operations of the DHCT 200, an output system 228 for driving a display device (e.g., a television 140), and a tuner system 225.

The tuner system 225 tunes to a particular television service to be displayed via a television 140 and sends and receives various types of data to/from the headend 300. The tuner system 225 includes in one implementation, an out-of-band tuner for bi-directional quadrature phase shift keying (QPSK) data communication and an in-band quadrature amplitude modulation (QAM) tuner for receiving television signals and/or other in-band data. A receiver 226 receives user inputs that are provided via an input device such as, for example, among others, a transmitter with buttons located on the exterior of the terminal, a hand-held remote control device, or a keyboard.

A home network communications application (HNCA) 260 (FIG. 2B) enables communication with another DHCT via a home network interface (HNI) 290. The HNI 290 acts as an interface for transmitting and/or receiving data to/from other DHCTs that are coupled to a DHCT 200. The HNI 290 may be, for example, a USB (Universal Serial Bus), an Ethernet port, an IEEE-1394 connection, a serial port, a parallel port, a wireless radio frequency (RF) interface, a telephone line interface, or a coaxial cable interface, among others. In one possible implementation, the HNI 290 may be coupled to a DHCT via an Ethernet or USB hub. In another embodiment, the DHCT 200 may be connected to another DHCT via another communication port (not shown) and/or via the communications network 130 (FIGS. 1A-1C).

The system memory 230, which may include volatile and/or non-volatile memory, stores one or more programmed software applications (herein referred to as applications) containing instructions that may be executed by the processor 224 under the auspices of the operating system 231. Data required as input by an application is stored in memory 230 and read by processor 224 from memory 230 as need be during the course of the application's execution. Input data for an application may be data stored in memory 230 by a secondary application or other source, either internal or external to the DHCT 200, or may be data that was included with the application at the time that it was created. Data generated by an application is stored in memory 230 by processor 224 during the course of the application's execution. The availability, location, and amount of data generated by one application for consumption by another application is communicated between applications with the help of an operating system.

The format of the data generated by a first application running in a first DHCT 200-1 (FIGS. 1A-1C) for consumption by a second instance of the same application executing in a second DHCT 200-2 (FIGS. 1A-1C) is preferably predetermined. Likewise, the format of the data generated by a first application running in a first DHCT 200-1 for consumption by a different application executing in a second DHCT 200-2 is also preferably predetermined. In another embodiment, the format of the data generated by a first application running in a first DHCT 200-1 for consumption by a second application executing in a second DHCT 200-2 is communicated between the two applications (e.g., the format may be carried as part of the data transferred between the applications). In such embodiment, the format of the data may be interpreted with the assistance of an operating system.

FIG. 2B is a block diagram depicting a non-limiting example of selected content of the system memory 230. A Navigator (application) 233 allows a user to select a service and helps provide various functionality, including volume and channel control. To implement its functionality, the Navigator 233 communicates with a platform 235. The platform 235 includes a collection of utilities, such as a Services Application Manager (SAM) 236, a timer manager 263, and a Window Manager 245, that are useful to the applications. The platform 235 also contains a Viewer Preference Manager 250 that serves to configure and set certain viewer preferences (e.g., a preferred font type or color for displayed graphics). The platform 235 may also include other utilities such as, for example, a compression manager, an HTML parser, a database manager, a widget toolkit, among others (not shown).

In one implementation, the Window Manager 245 maintains a user input registry 232 which is accessed to determine which of the various applications running on the DHCT 200 should receive a user input or a message and in what order. The Navigator 233 registers with the window manager 245 in order to receive user input commands that correspond to certain functions, such as, for example, channel up/down navigation and program guide initiation.

After the Navigator 233 is activated in response to a user input or a received message, it sends a query to the SAM 236 requesting information about a service. The received message may have been transmitted by a server at the headend 300 or by a second DHCT 200-2. When the SAM 236 receives a query from the Navigator 233, it accesses a service database 237 to inform the Navigator 233 about the existence and status of the requested service. The Navigator 233 can further query the SAM 236 to determine if the service is authorized for the DHCT 200 and, if so, can request the SAM 236 to activate the service. In response to a request for a service activation, the SAM 236 initiates a service activation message to the application that is identified in the service database as providing the desired service. As a non-limiting example, striking the "GUIDE" key 580 on the remote control device 500 (FIG. 5) may cause the SAM 236 to activate the interactive program guide (IPG) application 238.

The IPG application 238 displays a program guide to the user and populates the guide with information about television services. The IPG application 238 includes an IPG user interface module 239 that helps create an IPG screen for presentation to a user. The IPG user interface module 239 accesses configuration settings stored in an IPG configuration module 241 to implement an appropriate configuration for the IPG screen. The IPG configuration module 241 includes a configuration database 243 for storing a plurality of IPG configurations. The IPG user interface module 239 populates the IPG screen with information contained in an IPG database 240 which contains data files corresponding to a plurality of programs and services. For example, the IPG database 240 may include one or more database records per respective program and/or service available via the DHCT 200.

Based on the configuration information stored in the IPG configuration module 241, the IPG user interface module 239 utilizes the window manager 245 and other graphics utilities provided by the operating system 231 to render an IPG screen on a television 140. The window manager 245 is a component that, in one embodiment, is part of the platform 235, but in other embodiments may be part of the operating system 231.

In addition to the user input registry mentioned previously, the window manager 245 contains functionality for allocating screen areas and managing screen use among multiple applications. The operating system 231 provides primitives to the IPG user interface module 239 in order to help render images on a television 140 (FIG. 1).

As a screen is generated via a display device, the IPG user interface 239 registers with the window manager 245 for particular user input commands that may be required for selecting options provided by the newly-created screen. The IPG application 238 also contains a daemon application 246 that operates as a background process. The daemon application 246 receives IPG data files transmitted by the headend 300 and stores them in the IPG database 240 for utilization by the user interface 239.

When the DHCT 200 receives a message requesting a program reminder, the SAM 236 activates a background process of the timer manager 263 that associates data in the received message with one or more records in the IPG database 240. In another embodiment, a background process of the interactive program guide (IPG) application 238 associates the data in the received message with one or more records in the IPG database 240. Data in the received message may identify, for example, among others, a television program, a corresponding start time, and/or a corresponding duration.

One or more records in the IPG database 240 may be accessed while a background process associates data of a received message with records in the IPG database 240. Associations of message data with IPG records may be stored in system memory 230 as an identifiable subset of data belonging to either the timer manager 263 or to the IPG database 240.

The background process of the IPG application 238 may occur without the activation of the navigator 233 when the reminder message is received prior to the start time of the television program for which a reminder notice is to be implemented. The SAM 236 may cause the timer manager 263 to activate a timer that is responsive to the time specified by the received message, and to keep the timer active during the television program. Maintaining the timer active during the television program allows a reminder notice to be displayed when a viewer begins viewing a television 140 (FIG. 1) after the start time of the television program.

Applications executed by the resources of a DHCT 200 comprise executable instructions for implementing logical functions. The applications can be embodied in any computer-readable medium for use by or in connection with an instruction execution system. The instruction execution system may be, for example, a computer-based system, a processor-containing system, or any other system capable of executing instructions.

In the context of this document, a "computer-readable medium" can be any means that can contain, store, communicate, propagate, or transport the program for use by or in connection with the instruction execution system, apparatus, or device. The computer readable medium can be, for example, but is not limited to, an electronic, solid-state, magnetic, optical, electromagnetic, or semiconductor based medium, either internal to the DHCT 200 or externally connected to the DHCT 200 via one or more communication ports or network interfaces.

More specific examples (a non-exhaustive list) of a computer-readable medium include the following: an electrical connection having one or more wires, a portable computer diskette, a hard drive storage device, a random access memory (RAM), a read-only memory (ROM), an erasable programmable read-only memory (EPROM), an optical fiber, and a portable compact disc read-only memory (CDROM). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 3:
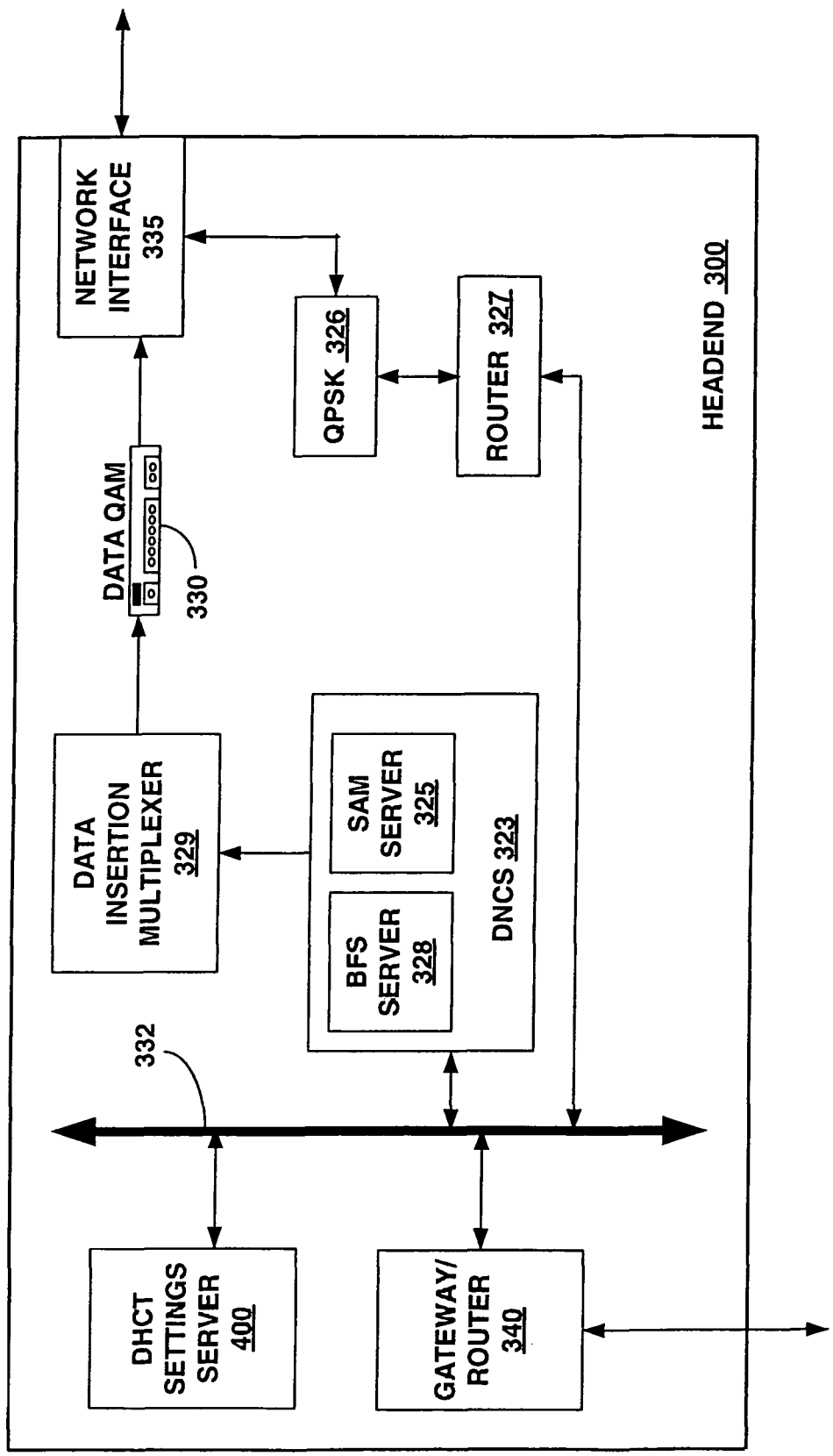
FIG. 3 is a block diagram depicting a non-limiting example of selected components of a headend in accordance with one embodiment of the invention.

FIG. 3 is a block diagram depicting a non-limiting example of selected components of a headend 300 in accordance with one embodiment of the invention. The headend 300 includes a DHCT-settings server 400 that is connected to a digital network control system (DNCS) 323 via a high-speed network such as an Ethernet connection 332.

The DNCS 323 provides management, monitoring, and control of the network's elements and of the broadcast services provided to users. In one implementation, the DNCS 323 uses a data insertion multiplexer 329 and a quadrature amplitude modulation (QAM) modulator 330 to insert in-band broadcast file system (BFS) data or messages into an MPEG-2 transport stream that is broadcast and received via a DHCT's communication interface 222 and tuner system 225 (FIG. 2A). Alternatively, a message may be transmitted by the DNCS 323 as a file or as part of a file.

A quadrature-phase-shift-keying (QPSK) modem 326 is responsible for transporting out-of-band IP (Internet protocol) datagram traffic between the headend 300 and a DHCT 200. Data from the QPSK modem 326 is routed by a headend router 327. The DNCS 323 can also insert out-of-band broadcast file system (BFS) data into a stream that is broadcast by the headend 300 and received by a DHCT 200 via its communication interface 222 and tuner system 225 (FIG. 2A). The headend router 327 is also responsible for delivering upstream application traffic to the various servers such as, for example, the DHCT-settings server 400. A gateway/router device 340 routes data between the headend 300 and the Internet.

A service application manager (SAM) server 325 is a server component of a client-server pair of components, with the client component being located at the DHCT 200. Together, the client-server SAM components provide a system in which the user can access services that are identified by an application to be executed and a parameter that is specific to that service. An example of an application is the Watch-TV application 262 (FIG. 2B), and an example of a parameter is the ABC channel. The client-server SAM components also manage the life cycle of applications in the system, including the definition, activation, and suspension of services they provide and the downloading of applications into a DHCT 200 as necessary.

Applications on both the headend 300 and a DHCT 200 can access the data stored in a broadcast file system (BFS) server 328 in a similar manner to a file system found in operating systems. The BFS server 328 and its counterpart, the BFS client 244 (FIG. 2B), are part of a file broadcasting system. The BFS server 328 repeatedly sends data for applications on a data carousel (not shown) over a period of time in a cyclical manner so that a DHCT 200 may access the data, as needed, via the BFS client 244 either via an "in-band radio-frequency (RF) channel" or an "out-of-band RF channel."

Figure 4:
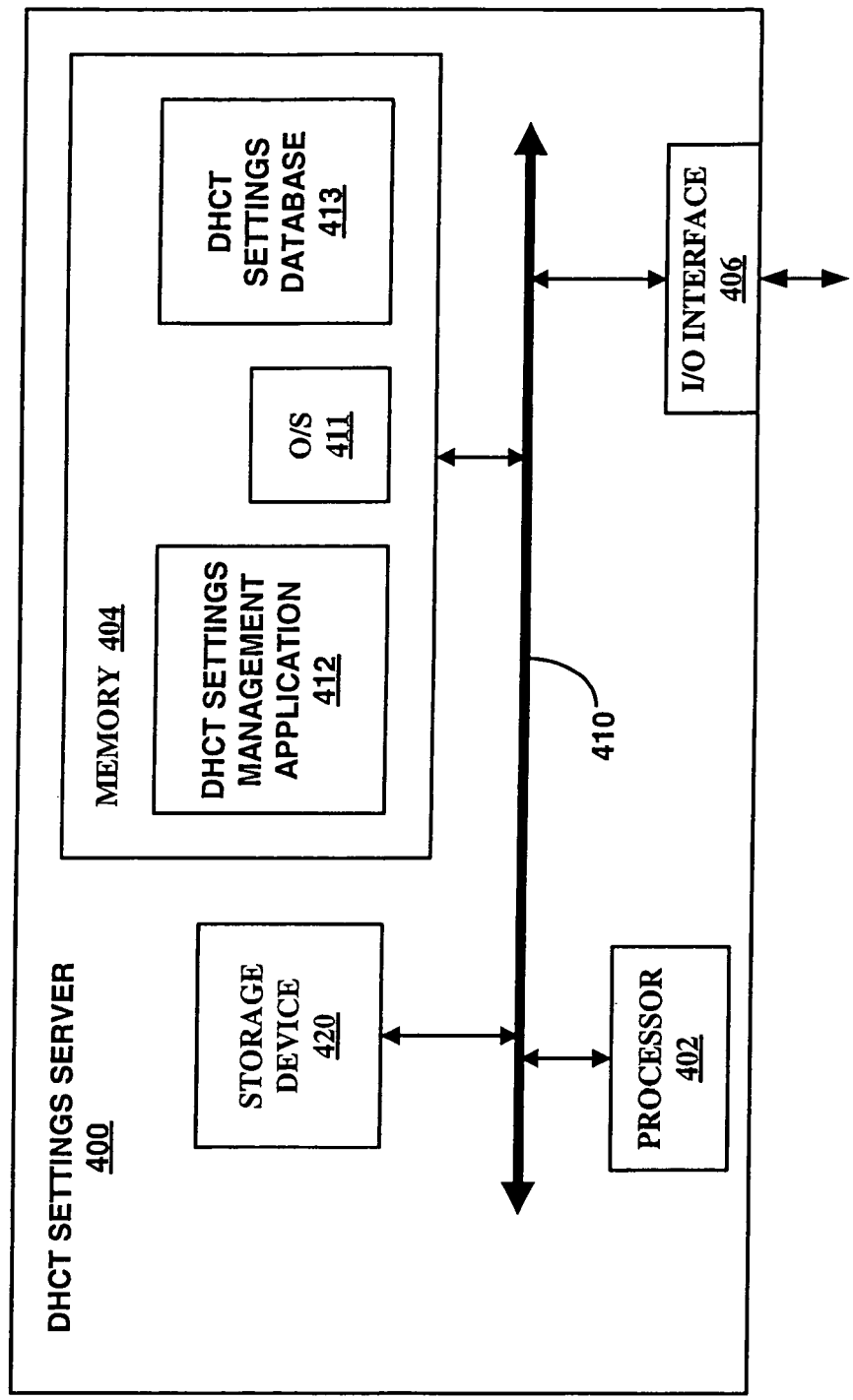
FIG. 4 is a block diagram depicting a non-limiting example of a DHCT-settings server that may be located at a headend shown in FIG. 3.

FIG. 4 is a block diagram depicting a non-limiting example of a DHCT-settings server 400 that may be located at a headend 300 (FIG. 3). In this example, the DHCT-settings server 400 is a digital computer that, in terms of hardware architecture, generally includes a processor 402, memory 404, non-volatile memory such as a storage device 420, and an input/output (I/O) interface 406. These components (402, 404, and 406) are communicatively coupled via a local interface 410.

The local interface 410 can be, for example but not limited to, one or more buses or other wired or wireless connections. The local interface 410 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 402 is a hardware device for executing software, particularly that stored in memory 404. The processor 402 can be any custom made or commercially available processor, a central processing unit (CPU), an auxiliary processor among several processors associated with the DHCT-settings server 400, a semiconductor-based microprocessor (in the form of a microchip or chip set), or generally any device for executing software instructions. The processor 402 may be one of a plurality of processors that implement a multiple processor server architecture. When the DHCT-settings server 400 is in operation, the processor 402 is configured to execute software stored within the memory 404, to communicate data to and from the memory 404, and to generally control operations of the DHCT-settings server 400 pursuant to the software.

The memory 404 can include any one or combination of read/write volatile memory elements (e.g., RAM, DRAM, SRAM, SDRAM, etc.) and nonvolatile memory elements. The non-volatile memory elements may include one or more read-write memory elements (e.g., a hard disk, a tape, and/or a DVD-RW) and/or read-only elements (e.g., ROM and/or CDROM). Moreover, the memory 404 may incorporate electronic, magnetic, optical, and/or other types of storage media. Note that the memory 404 can have a distributed architecture, where various components are situated remote from one another, but can be accessed by the processor 402.

The software in memory 404 may include one or more software programs, each of which comprises executable instructions for implementing logical functions. In the example of FIG. 4, the software in the memory 404 includes a DHCT settings management application (DSMA) 412 and a suitable operating system (O/S) 411. The O/S 411 essentially controls the execution of other computer programs, such as the DSMA 412, and provides scheduling, input-output control, file and data management, memory management, and communication control and related services.

The DSMA 412 may be used for receiving and storing DHCT settings from a first DHCT 200-1 and for transmitting the DHCT settings at a future time to the first DHCT 200-1 or to a second DHCT 200-2. The second DHCT 200-2 may be located at the same or different customer premises as the first DHCT 200-1. When the DSMA 412 is implemented in software, as is shown in FIG. 4, it may be stored on any computer readable medium for use by or in connection with any computer related system or method.

DHCT settings may be specified, transmitted and stored in a predetermined format. The DSMA 412 may store and organize a plurality of sets of DHCT settings in storage device 420 in a structured and organized way by using, for example, a database technology or an organized file system. Each set of DHCT settings may be specified by a plurality of data fields. In one example, some or all of the following information, among others, may be provided by respective data fields corresponding to a set of DHCT settings:

1. Identification of the data fields as corresponding to DHCT settings.
2. Whether settings are to be implemented or cancelled. For example, a "SET" indication causes settings to be implemented, whereas a "CANCEL" indication causes a prior setting to be cancelled (assuming it has not yet expired).
3. The identity of a first DHCT 200-1 that originated the DHCT settings. The DHCT 200-1 may be identified via, for example, its media access control (MAC) address.
4. The identity of a user that requested the DHCT settings.
5. The identity of a second DHCT 200-2 or a group of DHCTs entitled to receive the DHCT settings, if applicable.
6. When the settings originated (e.g., date and/or time).
7. When the DHCT settings expires (e.g., date and/or time).
8. The number of settings included in the set of DHCT settings.
9. Information regarding the accessibility of the DHCT settings, including one or more of the following:
   i. The DHCT settings are transmittable only to the DHCT that originated the DHCT settings.
   ii. The DHCT settings are transmittable to another DHCT.
   iii. The DHCT settings are transmittable only to a DHCT located at the same customer premises.
   iv. The DHCT settings are transmittable only to a DHCT with the same account registration
   v. The DHCT settings are accessible from a non-DHCT device (e.g., a personal computer).
   vi. The DHCT settings are accessible from a remote location (e.g., via the Internet).
   vii. The DHCT settings are accessible with user authentication.
10. Information associated with one or more television programs or services. For example, some or all of the following information may be provided by respective data fields corresponding to a certain television program or service:
    a. A title or identity of the program or service
    b. A start time for the program
    c. An end time for the program
    d. A duration of the program
    e. Actions to be taken in connection with the program or service
       i. Providing a reminder in connection with the program or service
       ii. Recording the program or service
       iii. Blocking the program or service from being viewed
       iv. Requiring parental authorization to view the program or service The DSMA 412 stores a first set of DHCT settings received from a first DHCT 200 in storage device 420. For the purpose of transmitting a first set of DHCT settings over the out-of-band channel, the DSMA 412 reads the first set of DHCT settings from storage device 420 and writes it to memory 404. The processor 402 may then include the DHCT settings in a file that is to be transmitted using a broadcast file system (BFS). The processor 402 may also packetize the DHCT settings prior to their transmission over an in-band or out-of-band transmission channel. The DSMA 412 may impose predetermined limits relating to the DHCT settings that are stored in the storage device 420. These limits may include one or more of the following, among others:
   1—A limit on the duration that the DHCT settings are stored in the storage device 420.
   2—A limit on the number of sets of DHCT settings corresponding to a certain DHCT 200 that are stored in the storage device 420.
   3—A limit on the overall number of programs and/or services for which DHCT settings corresponding to a certain DHCT 200 are stored in the storage device 420.

In an alternative embodiment, the DSMA 412 may be implemented in hardware using, for example, any or a combination of the following technologies which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

A first DHCT 200-1 that originates a set of DHCT settings stored at the server 400 may later retrieve such DHCT settings. Therefore, the DHCT 200-1 may implement the DHCT settings at a future time without having to store such settings within the first DHCT 200-1. This feature enables the first DHCT 200-1 to provide certain functionality to users without the need for additional non-volatile memory within the DHCT 200-1 for storing the related settings. As a result, the first DHCT 200-1 may be manufactured at a lower cost.

The destination DHCTs 200 allowed to receive a set of DHCT settings generated by a first DHCT 200-1 may be constrained by the cable operator. For instance, a cable operator may allow only destination DHCTs 200 that are located within the same premise or that are under the same account registration to access such DHCT settings. Furthermore, a destination DHCT may be required to be located within the same network hub or cable headend network as the first DHCT 200-1 in order to receive DHCT settings generated by the first DHCT 200-1.

In one embodiment, a second DHCT 200-2 must be pre-authorized through user input to receive DHCT settings from a first DHCT 200-1. The pre-authorization may be accomplished, for example, by inputting the identification of the first DHCT 200-1 into the DHCT 200-2 (e.g., via a remote control device). A general settings application 264 running in DHCT 200-2 may be configured to allow a user to interactively enter the respective identification of one or more DHCTs 200 from which the second DHCT 200-2 may receive DHCT settings. Likewise, a first DHCT 200-1 may be pre-authorized through user input to transmit (directly or indirectly) DHCT settings to a second DHCT 200-2. The pre-authorization may be accomplished, for example, by inputting the identification of the second DHCT 200-2 into the DHCT 200-1.

The transfer of DHCT settings from a first DHCT 200-1 to a second DHCT 200-2 may either be performed at no extra charge to a user, or may be enabled in exchange for a fee. Furthermore, a user may be required to be in good standing with a cable operator (e.g., not in default on a bill payment) in order to be authorized to transmit or receive DHCT settings to/from another DHCT 200.

Figure 5:
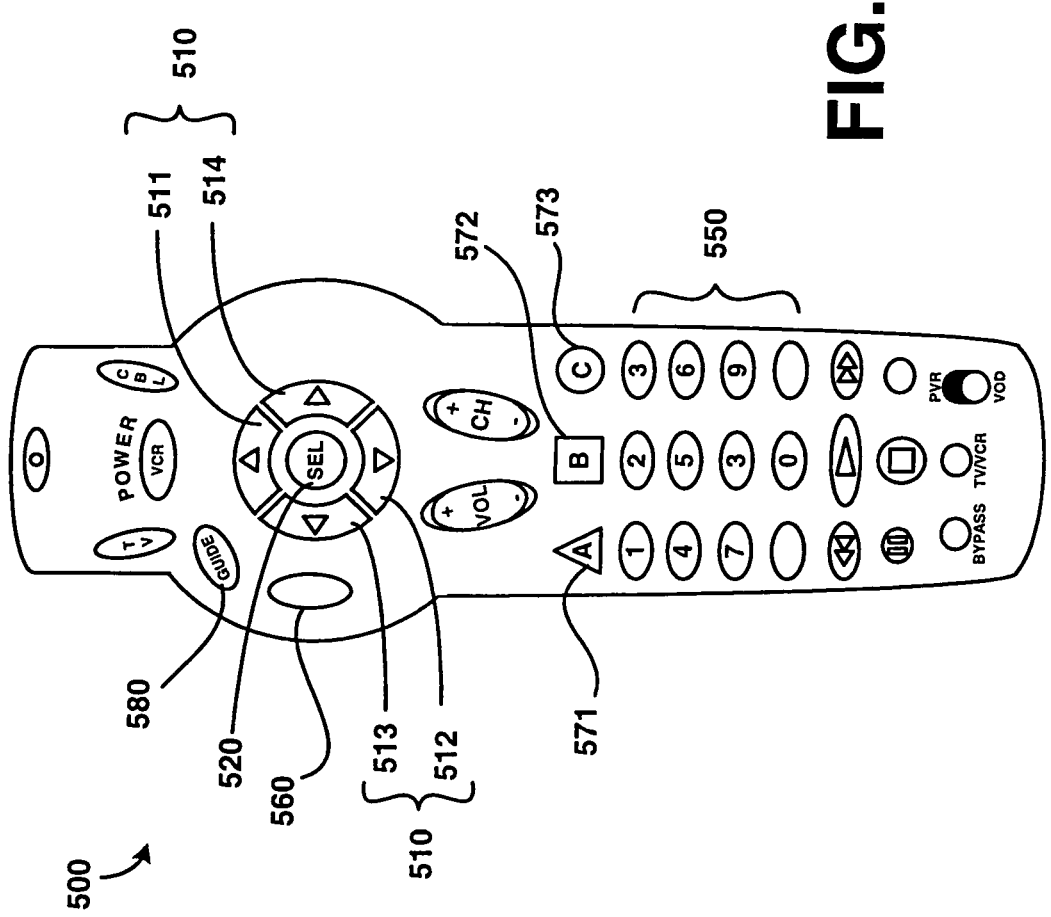
FIG. 5 is a schematic diagram depicting a non-limiting example of a remote control device (RCD) that may be used to provide user input to the DHCT depicted in FIG. 2A.
Figure 6:
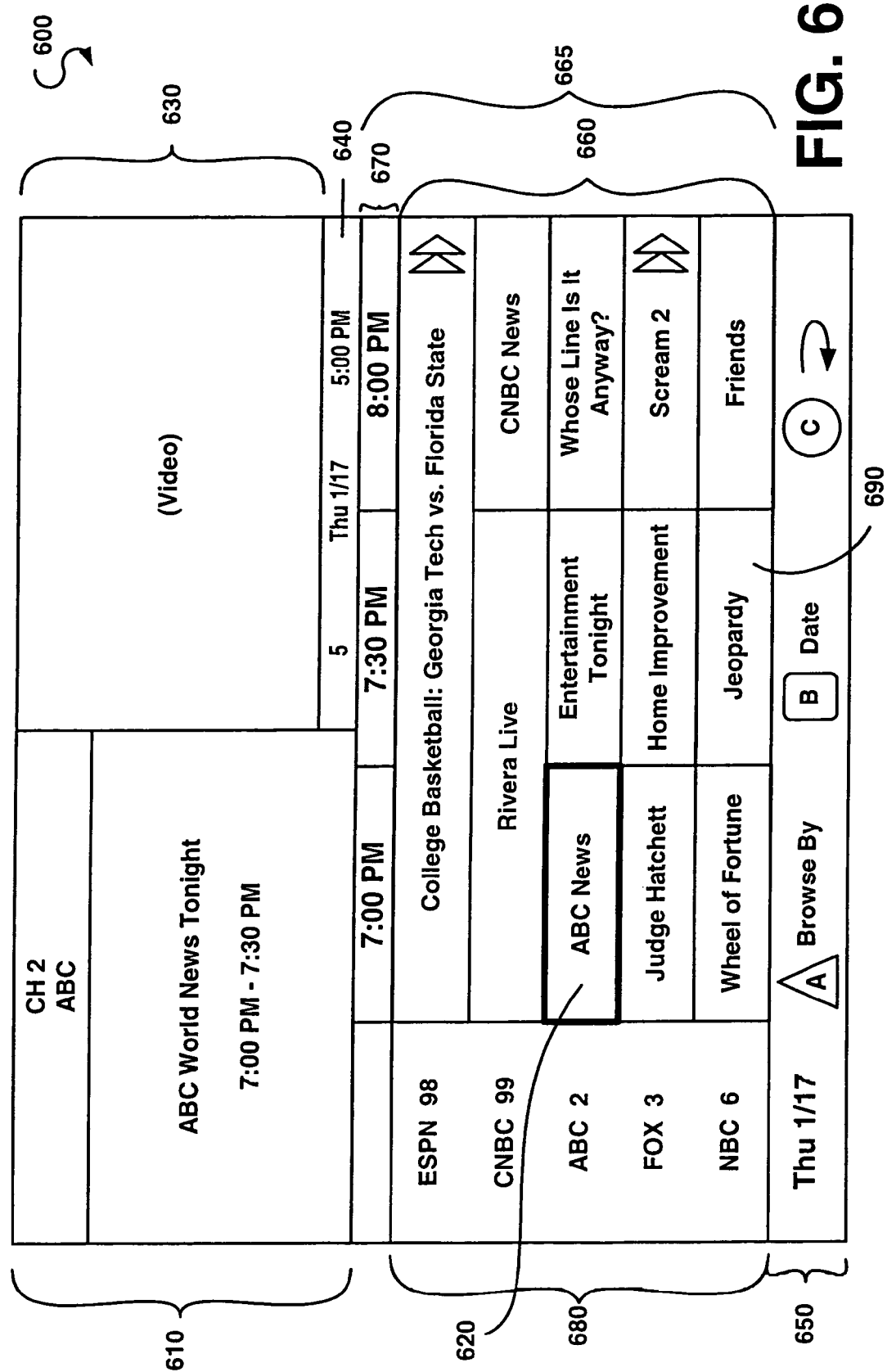
FIG. 6 is a schematic diagram depicting a non-limiting example of an IPG screen that illustrates an initial program guide arrangement in a time format.

FIG. 5 depicts a non-limiting example of a remote control device (RCD) 500 that may be used to provide user input to the DHCT 200. The RCD 500 described herein is merely illustrative and should not be construed as implying any limitations upon the scope of the present invention. Four arrow keys 510 are provided including an up arrow key 511, a down arrow key 512, a left arrow key 513, and a right arrow key 514. The arrow keys 510 can be used to scroll through and/or highlight on-screen options, whereas the select key 520 may be used to select a currently highlighted option. The guide key 580 may be used to access a television program guide such as, for example, IPG screen 600 (FIG. 6).

The function of the "A" key 571, the "B" key 572, and the "C" key 573 varies depending on the screen being presented to a user at the time of a key's activation. In one embodiment, the "A" key 571 can be used to access a browse-by list for requesting an IPG screen that contains a subset of listings corresponding to a selected browse-by category (e.g., comedy, drama, sports, etc.); the "B" key 572 can be used to request an IPG screen containing service listings for a user selected date; and the "C" key 573 can be used to request service listings corresponding to a current time and a currently tuned TV channel.

In one embodiment of the invention, the RCD 500 comprises a first key (not shown) that can be used to initiate retrieval of DHCT settings from another DHCT, and a second key (not shown) that can be used to initiate the transmission of DHCT settings to the headend 300 (FIG. 1) and/or to another DHCT 200. Alternatively, a single key may be used to initiate retrieval or transmission of the DHCT settings.

In an alternative embodiment of the invention, different and/or additional systems and methods for providing user input may be used including, for example, a remote control device having different keys and/or key layouts, a keyboard device, a mouse, a voice activated input system, a touch-screen display, etc. The invention described herein is not limited by the type of device used to provide user input.

With additional reference to FIGS. 1-5 throughout the remaining figure descriptions, FIG. 6 depicts a non-limiting example of an IPG screen 600 that illustrates an initial program guide arrangement in a time format. The IPG screen 600 may be presented by IPG application 238 in response to user input that is provided via, for example, the activation of the guide key 580 (FIG. 5). The IPG application 238 (FIG. 2B) works in cooperation with the window manager 245 (FIG. 2B) to present a user with IPG screens that are formatted in accordance with IPG configuration data that is stored in an IPG configuration database 243 (FIG. 2B). Furthermore, an IPG application 238 may retrieve television program information from an IPG database 240 as needed for presentation via an IPG screen.

The top left portion of IPG screen 600 is a detailed focus area 610 that includes detailed television service information for a currently highlighted program listing which, in the current example, is the ABC News listing 620. The detailed service information may include channel number, service name, television program name, television program description, television program duration, and/or any episode information or rating.

A television program occupying the full TV screen before the user is presented with IPG screen 600 is displayed in a video area 630. Immediately below the video area 630 is an information banner 640 for displaying the television channel number to which the DHCT 200 is currently tuned (e.g., television channel 5), the current day and date (e.g., Thursday, January 17), and the current time (e.g., 5:00 p.m.).

An IPG grid 665 includes a program listing area 660, a time listing area 670, and a channel listing area 680. The program listing area 660 contains a listing of titles corresponding to television programs that are available for viewing during the time periods listed in the time listing area 670, and that are provided via respective television services identified in television channel listing area 680. The television channel listing area 680 includes a vertical list of television services organized sequentially from top to bottom by increasing television channel number (except for the lowest numbered television service which is typically listed immediately below the highest numbered television service). In one embodiment, the arrow keys 510 (FIG. 5) can be used to scroll through the program listing area 660 and to highlight a desired program listing. The bottom area 650 of IPG screen 600 indicates the selected day for which television program data is being displayed as well as information about the current functions of the "A", "B", and "C" keys on the remote control 500.

In an alternative embodiment, an IPG screen may have fewer, additional, or different components and may have a different layout. For example, an IPG screen might not include a detailed focus area 610, a video area 630, an information banner 640, and/or a bottom area 650.

Figure 7:
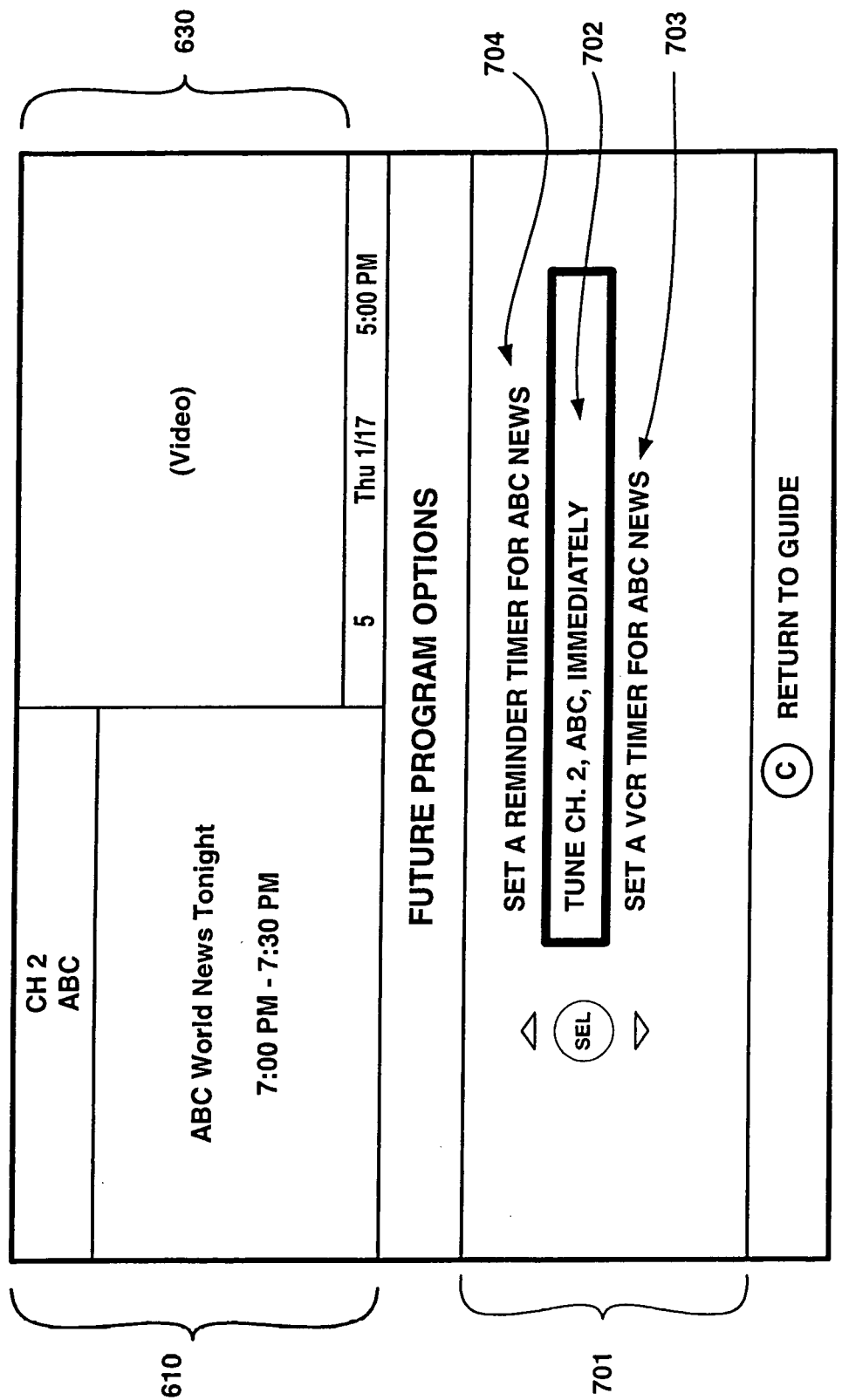
FIG. 7 is a schematic diagram depicting a non-limiting example of a Future Program Options screen that may be presented to a user in response to the selection of a highlighted listing via the IPG screen shown in FIG. 6.

FIG. 7 is a non-limiting example of a Future Program Options screen 700-1 that may be presented to a user in response to the selection of a highlighted program listing via the IPG screen 600 (FIG. 6). As shown in FIG. 7, a Future Program Options menu 701 provides the user with three options: an option 702 to tune to a channel corresponding to the selected TV program, an option 703 to set a video cassette recorder ("VCR") timer to record the TV program, and an option 704 to schedule a reminder notice for the TV program. Additional options (not shown) can include, for example, an option for blocking a selected program and/or an option for requiring a parental authorization PIN to be entered for the selected program.

If the user selects option 702, then the Future Program Options screen 700-1 disappears, and the user is presented with a television program that is currently available on the channel (e.g., channel 2) identified by option 702. If the user selects option 703, then the DHCT 200 is scheduled to output the desired television program during its scheduled broadcast time to a VCR. Furthermore, upon selection of option 703, the Future Program Options screen 700-1 disappears and the user is once again provided with the IPG screen 600 (FIG. 6).

If the user selects option 704, then the DHCT 200, at a future time, presents the user with a reminder notice for reminding the user that the desired television program has begun or is about to begin. In one embodiment, the reminder may be in the form of a banner that is displayed at the bottom of the user's television screen and that informs the user of the title, start time, and channel number corresponding to the desired television program. Such a banner is preferably displayed a short time (e.g., five minutes) prior to the start time of the desired television program. In one embodiment, multiple reminders may be scheduled for a single television program.

Implementing a reminder setting may be performed by the timer manager 263 or by the IPG application 238 using data contained in the IPG database 240. A reminder setting may associate a timer with a program title (or other identifier), a corresponding start time, and a corresponding duration. Records in the IPG database 240 may be accessed while a timer is being associated with a television program identified in the IPG database 240. Reminder settings associating timers with IPG records may be stored in system memory 230 as an identifiable subset of data belonging to either the timer manager 263 or to the IPG database 240. Reminder settings may be readily identifiable for rapid retrieval and portability.

The SAM 236 may cause the timer manager 263 to activate a timer that is responsive to a time specified by a reminder setting, and to keep the timer active during the corresponding television program. Maintaining the timer active during the television program allows a reminder notice to be displayed when a viewer begins viewing a television 140 (FIG. 1) after the start time of the television program.

Figure 8:
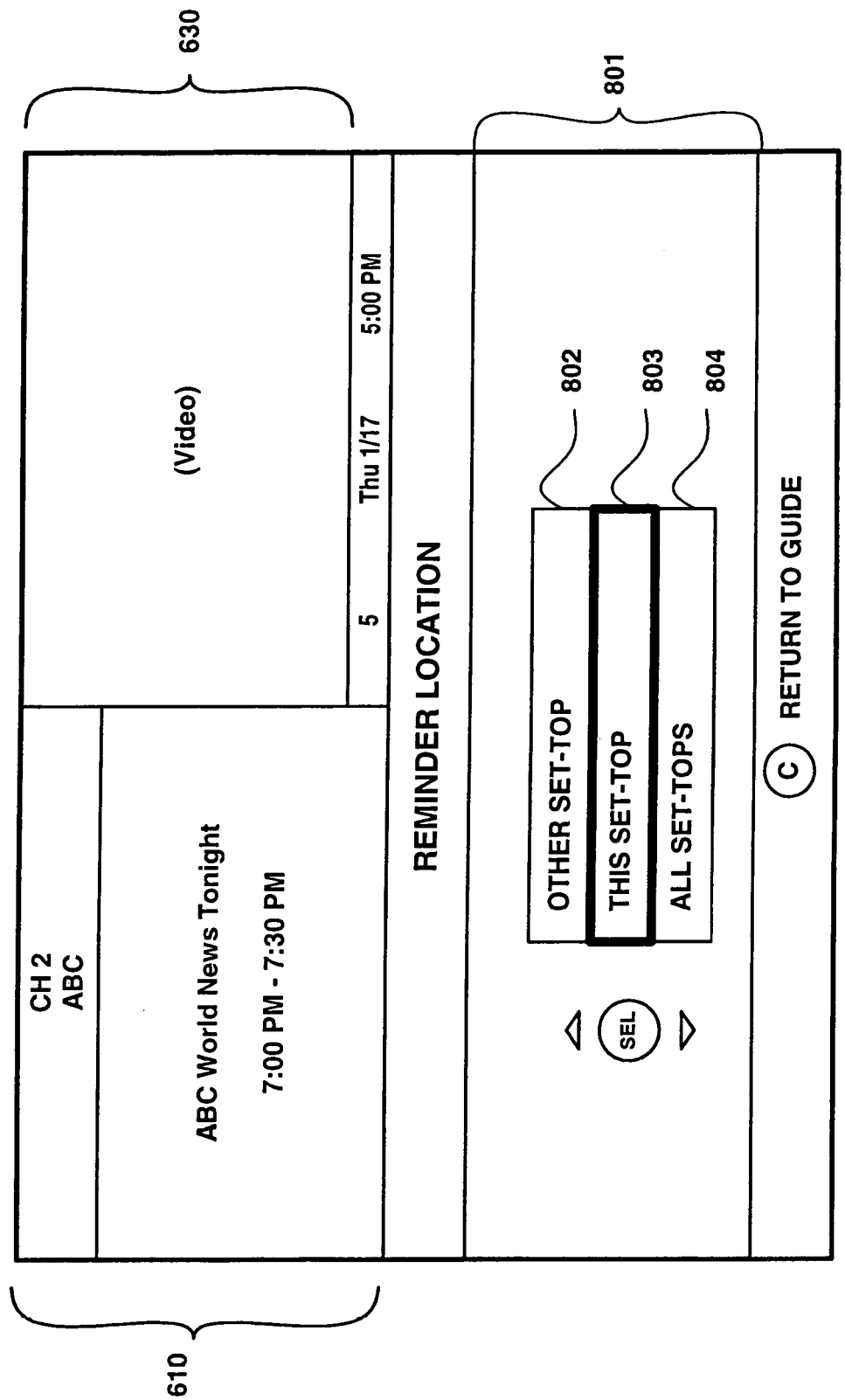
FIG. 8 is a schematic diagram depicting a non-limiting example of a Reminder Location screen that may be presented to a user in response to the selection of a corresponding option via the Future Program Options screen shown in FIG. 7.

FIG. 8 is a non-limiting example of a Reminder Location screen 800 that may be presented to a user in response to the selection of option 704 via the Future Program Options screen 700-1 (FIG. 7). A Reminder Location menu 801 provides the user with reminder location options 802-804. These options 802-804 allow a user to designate one or more locations where a reminder may be provided for a desired television program.

A user may select option 803 to schedule a reminder that is to be provided by a DHCT (e.g., DHCT 200-1) that is driving the television that the user is currently viewing. A user may alternatively select option 802 in order to schedule a reminder that is to be provided by another DHCT (e.g., DHCT 200-2) located remotely or at the customer premises (i.e., a DHCT that is not driving the television that the user is currently viewing). If the user desires that a reminder be provided at more than one location (e.g., via DHCT 200-1 and DHCT 200-2), then the user may select option 804 which results in a reminder being provided by a plurality of DHCTs located at the customer premises. Alternatively, the user may enter identification information for each respective DHCT 200 for which the user wishes to transmit the reminder or applicable information.

Figure 9:
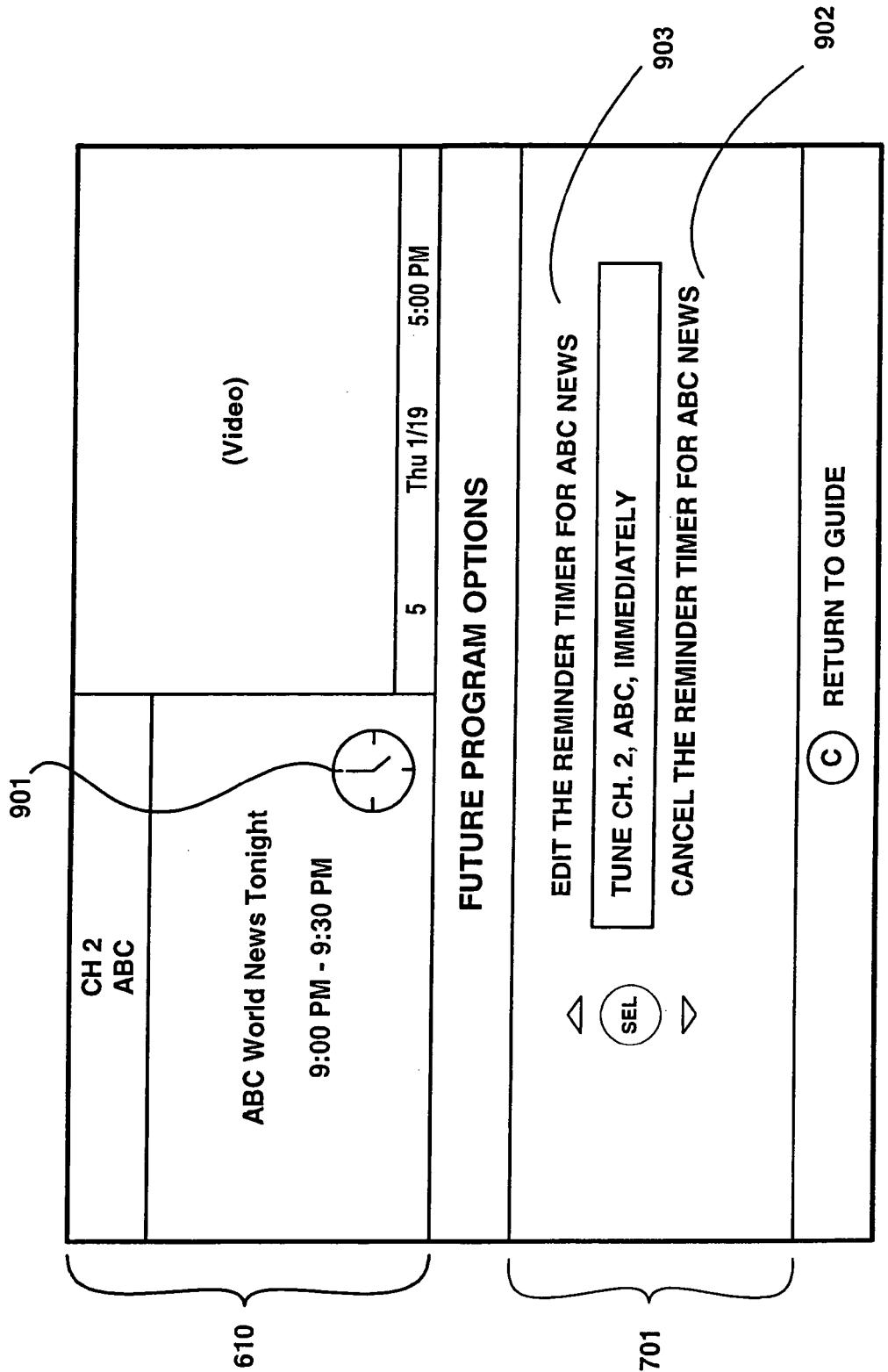
FIG. 9 is a schematic diagram depicting a non-limiting example of a Future Program Options screen.

FIG. 9 is a schematic diagram depicting a non-limiting example of a Future Program Options screen 700-2. The Future Program Options screen 700-2 may be presented to a user who selects the highlighted television program 620 (FIG. 6) after having selected option 704 (FIG. 7) to set a reminder for the desired television program. The detailed focus area 610 now contains a reminder icon 901 indicating that a reminder is scheduled for the desired television program. The user may select an option 902 to cancel the scheduled reminder. Alternatively, the user may select an option 903 to edit the scheduled reminder, in which case the General Settings screen 1000 shown in FIG. 10A may be provided to the user by the DHCT 200.

Figure 10A:
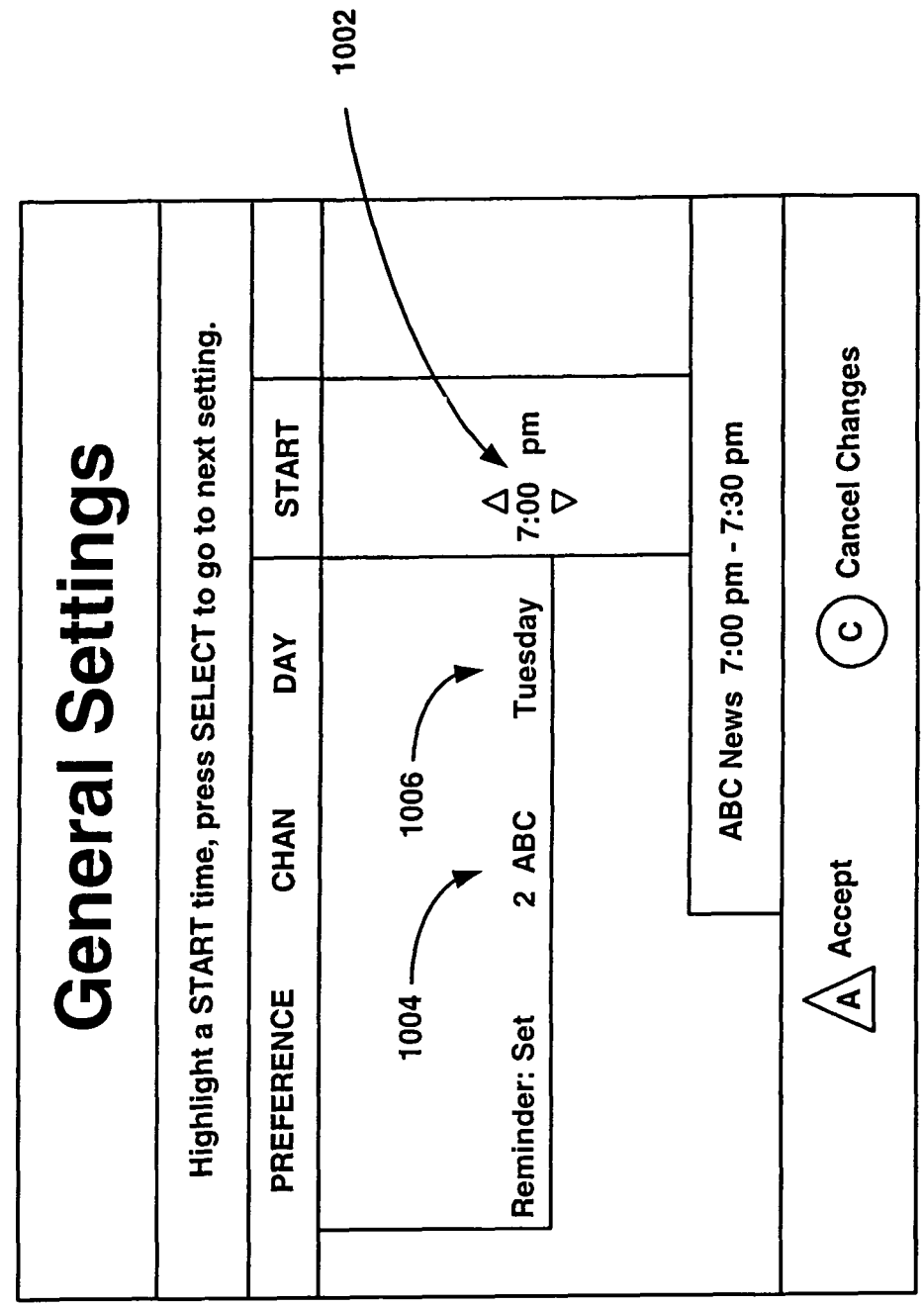
FIG. 10A is a schematic diagram depicting a non-limiting example of a General Settings screen that may be used to edit a scheduled reminder.
Figure 10B:
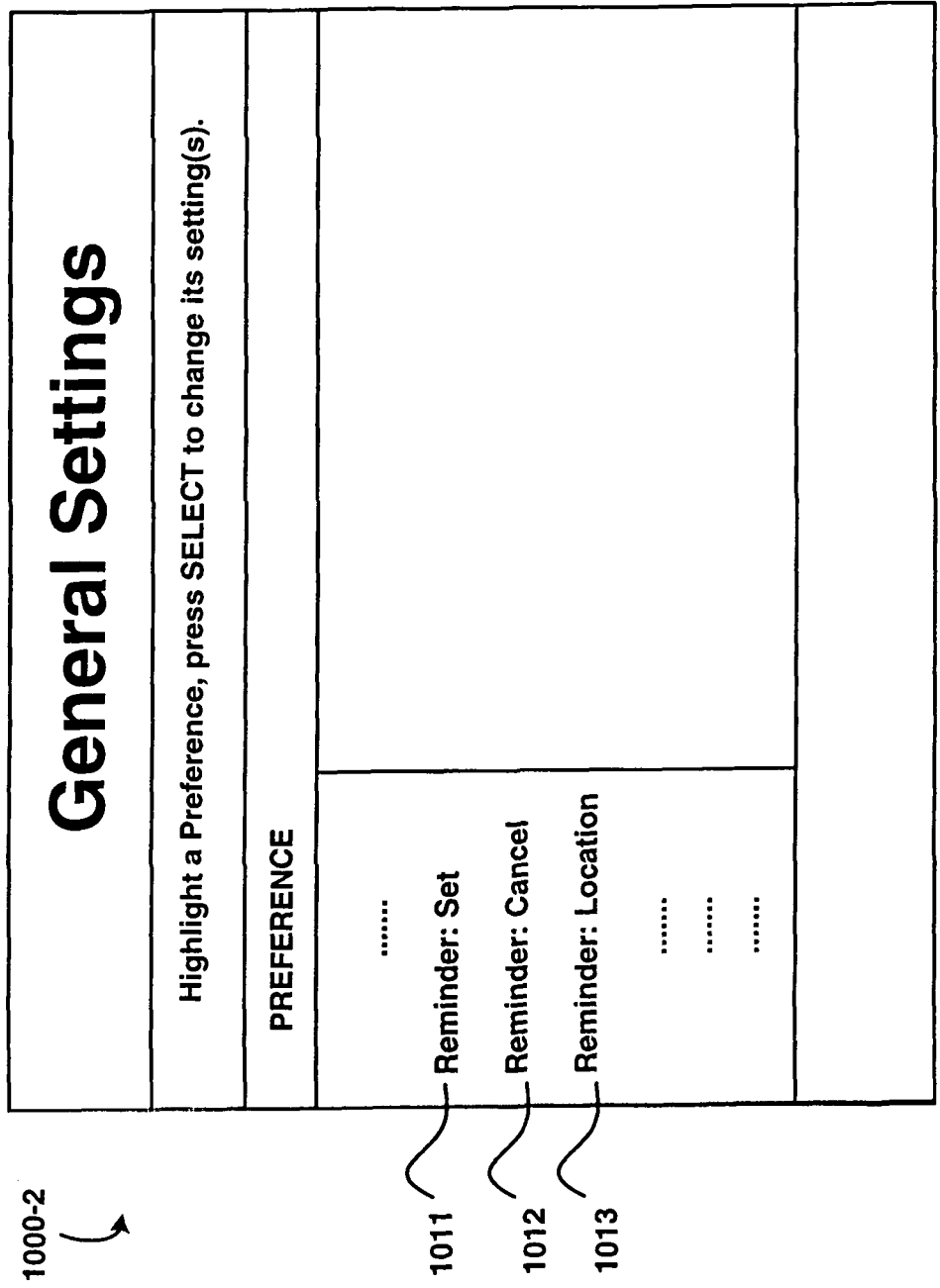
FIG. 10B is a schematic diagram depicting a non-limiting example of a General Settings screen that may be used to access other General Settings screens.

FIG. 10A is a schematic diagram depicting a non-limiting example of a General Settings screen 1000-1 that may be used to edit a scheduled reminder. The General Settings screen 1000-1 may be presented to a user in response to the selection of option 903 via the Future Program Options screen 700-2 (FIG. 9), or in response to the selection of a certain option on a preceding General Settings screen (e.g., as shown in FIG. 10B). The user may use a remote control device (e.g., RCD 500, FIG. 5) to edit a scheduled reminder. For example, a user may use the left and right arrow keys 513 and 514 to highlight a desired parameter, and the up and down arrow keys 511 and 512 to modify a highlighted parameter.

In this example, the parameters include a start time indication 1002, television channel indication 1004, and a day indication 1006. The start time indication 1002 and the day indication 1006 indicate the time and day, respectively, that a reminder is scheduled to be presented to a user. The television channel indication 1004 indicates the television channel that will provide the television program for which the reminder is scheduled. Once the parameters of a scheduled reminder are edited, the General Settings screen 1000 may be exited by activating the "A" key 571 on the RCD 500 (FIG. 5).

FIG. 10B is a schematic diagram depicting a non-limiting example of a General Settings screen 1000-2 that may be used to help specify DHCT settings. The General Settings screen 1000-2 may be presented to a user in response to the activation of a certain key (e.g., the settings key 560) on the remote control device 500. As shown in FIG. 10B, the General Settings screen 1000-2 includes an option 1011 for setting a reminder, an option 1012 for canceling a reminder, and an option 1013 for specifying the location of a reminder.

Selecting option 1011 may, for example, result in the presentation of the General Settings screen 1000-1 shown in FIG. 10A. Selecting option 1012 may result in the presentation of another General Settings screen (not shown) that provides a list of reminder settings which may be cancelled. A user may then use the remote control device 500 (FIG. 5) to select a reminder setting that is to be cancelled. Selecting option 1013 may result in the presentation of yet another General Settings screen (not shown) that prompts the user to select or enter a location where a reminder setting is to be transmitted.

One or more modes of transmission of a set of DHCT settings from a first DHCT 200-1 to a second DHCT 200-2 may be available in a cable network, including, for example, one or more of the following, among others:

1. DHCT settings may be uploaded by a first DHCT 200-1 to a remote server, and then downloaded by a second DHCT 200-2 from the remote server. As a non-limiting example, the DHCT settings may be transmitted to the DHCT settings server 400 (FIG. 4) where they may be stored in the storage device 420 by the DSMA 412. The DHCT settings may then be downloaded from the remote server by a second DHCT 200-2 (e.g., in response to user input).

2. DHCT settings may be transmitted from a first DHCT 200-1 to a second DHCT 200-2. The address used for transmitting the DHCT settings to the second DHCT 200-2 may be, for example, a media access control (MAC) address. Prior to receiving DHCT settings from the DHCT 200-1, the second DHCT 200-2 may be enabled to receive such settings through user input. DHCT settings that are received from a non-authorized DHCT 200 may be filtered out or otherwise not received by the DHCT 200-2. Once the DHCT 200-2 is enabled to receive DHCT settings, further user input may not be required prior to the DHCT 200-2 receiving DHCT settings. In one implementation, when DHCT settings are received by the DHCT 200-2, they are forwarded to one or more application(s) that is/are responsible for implementing such DHCT settings. For example, the IPG application 238 (FIG. 2B) may receive and implement DHCT settings for a program reminder.

3. DHCT settings stored in a first DHCT 200-1 may be retrieved by a second DHCT 200-2. The first DHCT 200-1 may be configured to enable retrieval of DHCT settings by the second DHCT 200-2. User authentication may be required to enable retrieval of DHCT settings. Once the first DHCT 200-1 is configured to allow retrieval of DHCT settings, a user may be able to retrieve DHCT settings using the second DHCT 200-2 without the need for providing additional user input to the first DHCT 200-1.

Note that DHCT settings that are communicated between DHCTs 200 may be stored or buffered at the headend 300. In one embodiment all DHCT settings that are communicated between DHCTs 200 are stored at the headend 300 to enable error recovery and/or to provide additional flexibility.

DHCT settings may be communicated between DHCTs 200 using a predetermined format. For example, DHCT settings generated by a first application residing at a first DHCT 200-1 may be communicated to a second application residing at a second DHCT 200-2 using a standardized format. This standardized format enables the second application to interpret and implement the DHCT settings, even if the second application is a different type of application than the first application.

In one embodiment, the second DHCT 200-2 executes an application that searches the IPG database 240 (FIG. 2B) for the programs and services specified in a set of DHCT settings received from the first DHCT 200-1. Thereafter, a background process of an IPG application 238 (FIG. 2B) residing at the second DHCT 200-2 may associate timers and/or reminders with the desired programs based on instruction contained in the DHCT settings.

Figure 11:
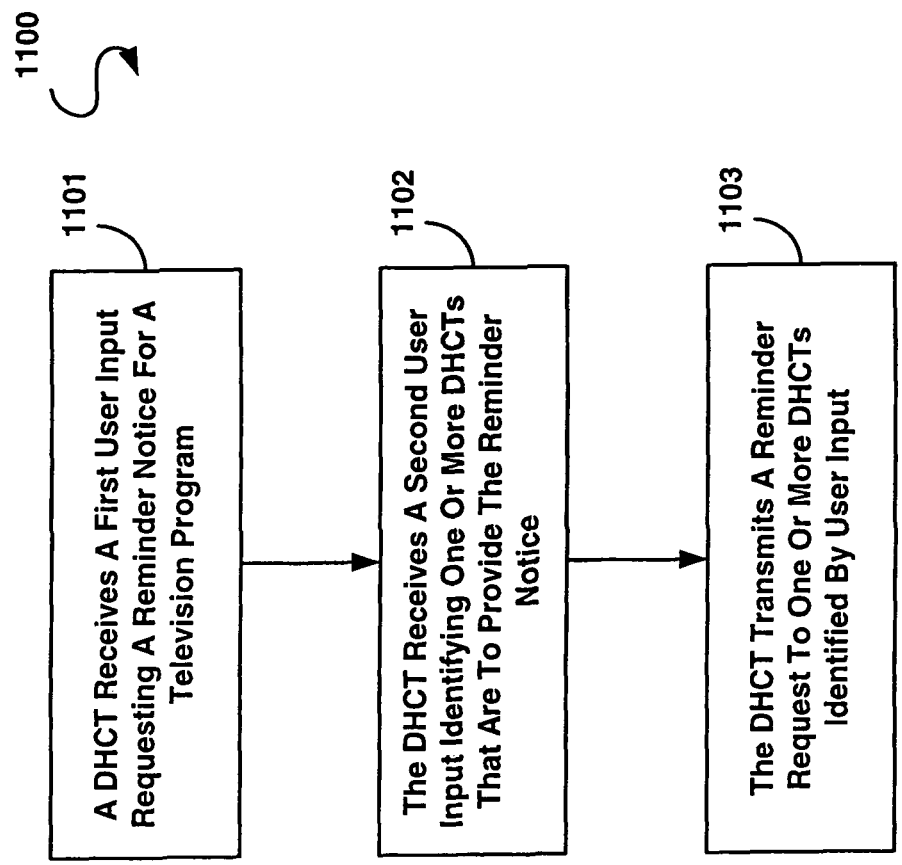
FIG. 11 is a flow chart depicting a method for providing a reminder in accordance with one embodiment of the invention.

FIG. 11 is a flow chart depicting a method 1100 in accordance with one embodiment of the invention. As indicated in block 1101, a DHCT receives a first user input requesting a reminder notice for a television program. The DHCT also receives a second user input identifying one or more DHCTs that are to provide the reminder notice (block 1102). In response to receiving the user inputs, the DHCT (e.g., DHCT 200-1) transmits a reminder request (block 1103) to one or more other DHCTs (e.g., DHCT 200-2) identified by the second user input. The reminder request preferably includes data identifying the title, start time, and television channel corresponding to a desired television program.

Once a reminder request is received by a DHCT, a reminder notice for the desired television program is scheduled and is subsequently presented to a user via a television. The reminder notice may be in the form of text message that is displayed on a television screen indicating that a desired television program is scheduled to start at a certain time and at a certain TV channel. In an alternative embodiment, a DHCT may automatically transmit a reminder request to one or more other DHCTs after receiving a first user input (block 1101) requesting a reminder notice for a television program.

FIG. 12A is a flow chart depicting a method 1200-1 in accordance with one embodiment of the invention. As indicated in block 1201, a first DHCT 200-1 receives a user input requesting that a DHCT setting be transmitted to a second DHCT 200-2. The DHCT setting may identify for example, among others, a favorite television channel, a favorite television program, and/or a scheduled reminder for a television program.

In response to receiving the user input, the DHCT 200-1 transmits (as indicated in block 1202) the DHCT setting to the DHCT 200-2, where it may be stored in a DHCT settings database 261 (FIG. 2B). The DHCT 200-2 then uses the received DHCT setting to provide a user with a function that is responsive to the DHCT setting, as indicated in step 1203. For example, if the DHCT setting identifies a reminder for a television program, then the reminder may be presented to a user (via a television) a short time prior to the program's start time. Furthermore, if the DHCT setting identifies a favorite television channel and/or favorite television program, then such channel and/or program may, for example, be exclusively or preferentially displayed via an IPG screen. In one embodiment, user authentication or log-in may be required by the DHCT 200-1 prior to the transmission of the DHCT setting to the DHCT 200-2.

FIG. 12B is a flow chart depicting a method 1200-2 in accordance with one embodiment of the invention. As indicated in block 1211, a second DHCT 200-2 receives a user input requesting that a DHCT setting be retrieved from a first DHCT 200-1. In response to receiving the user input, the DHCT 200-2 retrieves (as indicated in block 1212) the DHCT setting from the first DHCT 200-1, and stores the DHCT setting in a DHCT settings database 261 (FIG. 2B). The DHCT 200-2 then uses the retrieved DHCT setting to provide a user with a function that is responsive to the DHCT setting, as indicated in step 1213. In one embodiment, user authentication or log-in may be required by the DHCT 200-2 prior to the retrieval of the DHCT setting from the first DHCT 200-1.

FIG. 13 is a flow chart depicting a method 1300 in accordance with one embodiment of the invention. As indicated in block 1301, a server 400 (FIG. 3) receives a message from a first DHCT 200-1 (FIG. 1) identifying a television program for which a reminder has been requested. In response to receiving the message, the server 400 transmits, at a future time, a reminder message (block 1302) to at least a second DHCT 200-2 (FIG. 1). The reminder message, which identifies the television program, is preferably transmitted by the server 400 a short time prior to the start time of the desired television program.

After the second DHCT 200-2 receives the reminder message, it provides a user with a reminder notice for the television program. The reminder may include or may be based on data contained in the reminder message that is received from the server 400. The reminder may be in the form of text message that is displayed on a television screen indicating that a desired television program is scheduled to start at a certain time and/or on a certain TV channel.

FIG. 14 is a flow chart depicting a method 1400 in accordance with one embodiment of the invention. As indicated in block 1401, a server 400 receives DHCT settings from a first DHCT 200-1. The DHCT settings may identify for example, among others, favorite television channels, favorite television programs, and scheduled reminders for television programs.

After the DHCT settings are received by the server 400, they may be stored in a DHCT settings database 412 (FIG. 4). The server 400 then transmits the DHCT settings to at least a second DHCT 200-2. The DHCT settings may be transmitted to the second DHCT 200-2 either automatically or in response to a request from the second DHCT 200-2, depending on a desired implementation.

Any blocks or steps shown in FIGS. 11-14 represent modules, segments, or portions of code which include one or more executable instructions for implementing specific logical functions or steps in a process. The functionality provided by the methods illustrated in FIGS. 11-14 may be embodied in any computer-readable medium for use by or in connection with a computer-related system or method. Furthermore, the functionality provided by the methods illustrated in FIGS. 11-14, may also be implemented through hardware (e.g., an application specific integrated circuit (ASIC) and supporting circuitry) or a combination of software and hardware.

It should be emphasized that the above-described embodiments of the present invention, particularly any "preferred embodiments", are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and present invention and protected by the following claims. In addition, the scope of the present invention includes embodying the functionality of the preferred embodiments of the present invention in logic embodied in hardware and/or software-configured mediums.

What is claimed is:

1. A digital home communication terminal (DHCT) comprising:
   a memory device for storing television related data; and
   a processor configured to:
      enable a user to select a television functionality setting corresponding to a television program,
      receive an input from the user requesting transmission of a selected television functionality setting to another DHCT located at a different premises,
      store the television functionality setting in the memory device,
      authenticate that the DHCT settings of the other DHCT are accessible to the user, and
      transmit the television functionality setting from the memory device to the other DHCT, the television functionality setting allowing a DHCT to implement a television functionality associated with the television functionality setting on a television coupled thereto.

2. The DHCT of claim 1, wherein the television functionality setting is a reminder of a future broadcast of a television program for which a reminder is desired.

3. The DHCT of claim 1, wherein the processor is further configured to receive an input from the user requesting transmission of the television functionality setting to a plurality of other DHCTs each located at a premises other than the premises of the DHCT, the processor further configured to transmit the television functionality setting to a plurality of other DHCTs.

4. The DHCT of claim 3, wherein the DHCT communicates with the plurality of other DHCTs via a server of a headend.

5. The DHCT of claim 4, wherein the DHCT and plurality of other DHCTs are under the same user account.

6. The DHCT of claim 1, wherein the processor is configured to transmit the television functionality setting in response to a second input from the user.

* * * * *